US006854929B2

(12) United States Patent
Vinegar et al.

(10) Patent No.: US 6,854,929 B2
(45) Date of Patent: Feb. 15, 2005

(54) ISOLATION OF SOIL WITH A LOW TEMPERATURE BARRIER PRIOR TO CONDUCTIVE THERMAL TREATMENT OF THE SOIL

(75) Inventors: Harold J. Vinegar, Bellaire, TX (US); George L. Stegemeier, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 10/280,102

(22) Filed: Oct. 24, 2002

(65) Prior Publication Data

US 2004/0120772 A1 Jun. 24, 2004

Related U.S. Application Data

(60) Provisional application No. 60/343,637, filed on Oct. 24, 2001.

(51) Int. Cl.$^7$ .................................................. B09B 1/00
(52) U.S. Cl. ................ 405/129.65; 405/130; 405/128.4
(58) Field of Search .............................. 405/130, 131, 405/128.1, 128.35, 128.4, 128.55, 128.6, 129.45, 129.6, 129.65

(56) References Cited

U.S. PATENT DOCUMENTS

| | | | |
|---|---|---|---|
| 2,777,679 A | 1/1957 | Ljunstrom | |
| 3,004,601 A | 10/1961 | Bodine | |
| 3,016,053 A | 1/1962 | Medovick | |

(List continued on next page.)

FOREIGN PATENT DOCUMENTS

| | | |
|---|---|---|
| DE | 198 24 930 | 12/1992 |
| DE | 19707 096 | 5/1998 |
| DE | 196 48 928 | 6/1998 |
| DE | 198 01 321 | 7/1999 |
| DE | 199 27 134 | 12/2000 |
| EP | 592 225 | 4/1994 |
| GB | 1 366 357 | 9/1974 |
| WO | 98/52704 | 11/1998 |

OTHER PUBLICATIONS

International Search Report for PCT/ US02/34199 mailed Jul. 2, 2003, 8 pages.
International Search Report for PCT /US02/34273 mailed Feb. 18, 2003, 3 pages.
International Search Report for PCT /US02/34532 mailed Aug. 5, 2003, 3 pages.
U.S. Appl. No. 09/549,902 to Vinegar et al. entitled, "Vapor Collection and Treatment of Off–Gas from an In–Situ Thermal Desorption Soil Remediation".
U.S. Appl. No. 10/279,758 to Vinegar et al. entitled "Soil Remediation of Mercury Contamination".
U.S. Appl. No. 10/279,771 to Vinegar et al. entitled "Thermally Enhanced Soil Decontamination Method".

(List continued on next page.)

*Primary Examiner*—John Kreck
(74) *Attorney, Agent, or Firm*—Meyertons, Hood, Kivlin, Kowert & Goetzel, P.C.; Eric B. Meyertons

(57) ABSTRACT

Freeze wells may be used to isolate an area for soil remediation. Freeze wells may form a frozen barrier around a treatment area. The frozen barrier may inhibit fluid from entering into the treatment area. The frozen barrier may also inhibit migration of contamination out of the treatment area. The frozen barrier may be used to surround all of the perimeter of the treatment area. A frozen barrier may also be formed above or below a treatment area. Freeze wells may be activated in advance of soil remediation so that a frozen barrier is formed when soil remediation is begun. The soil remediation may be accomplished by any type of soil remediation system, including a thermal soil remediation system. Heaters of a thermal soil remediation system may be may be placed close to the frozen barrier without the barrier being broken through during remediation.

158 Claims, 18 Drawing Sheets

U.S. PATENT DOCUMENTS

| | | |
|---|---|---|
| 3,048,221 A | 8/1962 | Tek |
| 3,205,942 A | 9/1965 | Sandberg |
| 3,302,707 A | 2/1967 | Slusser et al. |
| 3,684,037 A | 8/1972 | Bodine |
| 4,017,309 A | 4/1977 | Johnson |
| 4,125,159 A | 11/1978 | Vann |
| 4,276,164 A | 6/1981 | Martone et al. |
| 4,305,463 A | 12/1981 | Zakiewicz |
| 4,380,930 A | 4/1983 | Podhrasky et al. |
| 4,399,866 A | 8/1983 | Dearth |
| 4,423,323 A | 12/1983 | Ellis et al. |
| 4,500,327 A | 2/1985 | Nishino et al. |
| 4,577,503 A | 3/1986 | Imaino et al. |
| 4,598,392 A | 7/1986 | Pann |
| 4,641,028 A | 2/1987 | Taylor et al. |
| 4,704,514 A | 11/1987 | Van Egmond et al. |
| 4,842,448 A | 6/1989 | Koerner et al. |
| 4,860,544 A | 8/1989 | Krieg et al. |
| 4,974,425 A | 12/1990 | Krieg et al. |
| 4,984,594 A | 1/1991 | Vinegar et al. |
| 5,067,852 A | 11/1991 | Plunkett |
| 5,076,727 A | 12/1991 | Johnson et al. |
| 5,114,497 A | 5/1992 | Johnson et al. |
| 5,169,263 A | 12/1992 | Johnson et al. |
| 5,190,405 A | 3/1993 | Vinegar et al. |
| 5,193,934 A | 3/1993 | Johnson et al. |
| 5,209,604 A | 5/1993 | Chou |
| 5,221,827 A | 6/1993 | Marsden, Jr. et al. |
| 5,228,804 A | 7/1993 | Balch |
| 5,229,583 A | 7/1993 | van Egmond et al. |
| 5,232,951 A | 8/1993 | Pfingstl et al. |
| 5,233,164 A | 8/1993 | Dicks et al. |
| 5,244,310 A | 9/1993 | Johnson |
| 5,249,368 A | 10/1993 | Bertino et al. |
| 5,271,693 A | 12/1993 | Johnson et al. |
| 5,295,763 A | 3/1994 | Stenborg et al. |
| 5,305,239 A | 4/1994 | Kinra |
| 5,318,116 A | 6/1994 | Vinegar et al. |
| 5,348,422 A | 9/1994 | Manchak, III et al. |
| 5,360,067 A | 11/1994 | Meo, III |
| 5,362,397 A | 11/1994 | Cyr |
| 5,403,119 A | 4/1995 | Hoyle |
| 5,416,257 A * | 5/1995 | Peters ..................... 405/129.6 |
| 5,435,666 A | 7/1995 | Hassett et al. |
| 5,507,149 A * | 4/1996 | Dash et al. .................... 405/56 |
| 5,545,803 A | 8/1996 | Heath et al. |
| 5,553,189 A | 9/1996 | Stegemeier et al. |
| 5,569,154 A | 10/1996 | Navetta |
| 5,656,239 A | 8/1997 | Stegemeier et al. |
| 5,660,500 A | 8/1997 | Marsden, Jr. et al. |
| 5,667,339 A * | 9/1997 | Dash .......................... 405/130 |
| 5,674,424 A | 10/1997 | Iben et al. |
| 5,681,130 A * | 10/1997 | Aines et al. ................ 405/130 |
| 5,730,550 A * | 3/1998 | Andersland et al. ...... 405/128.6 |
| 5,753,494 A | 5/1998 | Hater et al. |
| 5,779,762 A | 7/1998 | Kohr et al. |
| 5,836,718 A | 11/1998 | Price |
| 5,997,214 A | 12/1999 | de Rouffignac et al. |
| 6,039,508 A | 3/2000 | White |
| 6,102,622 A | 8/2000 | Vinegar et al. |
| 6,419,423 B1 | 7/2002 | Vinegar et al. |
| 6,543,539 B1 | 4/2003 | Vinegar et al. |
| 6,632,047 B2 | 10/2003 | Vinegar et al. |
| 6,688,387 B1 | 2/2004 | Wellington et al. |
| 2003/0110794 A1 | 6/2003 | Stegemeier et al. |
| 2003/0136558 A1 | 7/2003 | Wellington et al. |
| 2003/0192691 A1 | 10/2003 | Vinegar et al. |

OTHER PUBLICATIONS

Vinegar et al.; "In Situ Thermal Desorption of Soils Impacted with Chlorinated Solvents"; 1999; 23 pgs.

Vinegar et al.; "In Situ Thermal Desorption using Thermal Wells and Blankets"; 1998; 1 pg.

Conley et al.; "In Situ Thermal Desorption of Refined Petroleum Hydrocarbons from Saturated Soil"; 2000; pp. 1–10.

Hansen et al.; "In Situ Thermal Desorption of Coal Tar"; 1998; pp. 1–22.

Vinegar et al.; "Remediation of Deep Soil Contamination using Thermal Vacuum Wells"; Society of Petroleum Engineers; 1997; pp. 905–918.

Heron et al., "Soil Heating for Enhanced Remediation of Chlorinated Solvents: A Laboratory Study on Resistive Heating and Vapor Extraction in a Silty, Low–Permeable Soil Contaminated with Trichloroethylene"; Environmental science & Technology; 1998; 32(10); pp. 1474–1481.

Beal, C. "The Viscosity of Air, Water, Natural Gas, Crude Oil and Its Associated Gases at Oil Field Temperatures and Pressures" Petroleum Technology, 1945, pp. 94–115.

Cary, J.W., Mayland, H.F., Salt and more water movement in unsaturated frozen soil. Soil Science Societa of America, Proceedings, 1972, p. 549–555.

Dash, J. G. "Thermomolecular Pressure in Surface Melting: Motivation for Frost Heave", Science, 1989, pp. 1591–1593.

Gross et al. "Recent Experimental Work on Solute Redistribution at the Ice/Water Interface. Implications for Electrical Proprerties and Interface Process" J. de Physique, 1987, pp. 527–529.

Hallet, B. "Solute Redistribution in Freezing Ground" Proceeding of the thrid Internatinal Conference on Permafrost, 1978, pp. 86–91.

Harris, J.S. "Ground Freezing in Practice" Telford, 1995, pp. 1–264.

Hofmann et al. "Redistribution of Soil Water and Solutes in Fine and Coarse Textured Soils After Freezing" Frozen Soil Symposium, 1990, pp. 263–270.

"Heat Flow in Soils" pp. 93–98.

Iskandar, I. K. "Effect of Freezing on the Level of Contaiminatnts in Uncontrolled Hazardous Waste Sites" U.S. Army Corp of Engineers Special Report 86–19, 1986, pp. 1–33.

Oberlander et al. "Mitigative Techniques for Ground–Water Contaimination Associated with Severe Nuclear Accidents", NUREG?CR–4251, 1985, pp. 4.103–4.110.

Mathews et al. Pressure Buildup and Flow Tests in Wells, SPE, 1967, pp. 1–174.

Sanger, F. J. "Ground Freezing in Construction", J. Soil Mechanic and Foundations Division, ASCE, 1968, pp. 131–156.

Sullivan, Jr. et al. "Comparison of Numberical Simulaitons with Experimental Data for a Prototype Artificial Ground Freezing", CRREZ Special Report 90–1, pp. 36–43.

Swatzell et al. "Frozen Soil Barrier Technology" U.S. Dept. Of Energy, Innovative Technology Summary Report, Apr. 1995.

"Frozen Soil Barrier" U.S. Dept. of Energy, Innovative Technology Summary Report, DOE/EM–0483, Oct. 1999.

U.S. Army Corps of Engineers Pamphlet EP 415–1–261, 1997, Chapter 6, 12 pages.

* cited by examiner

ISOLATION OF SOIL WITH A LOW TEMPERATURE BARRIER PRIOR TO CONDUCTIVE THERMAL TREATMENT OF THE SOIL

PRIORITY CLAIM

This application claims priority to U.S. Provisional Application No. 60/343,637 entitled "Isolation Of Soil With A Frozen Barrier Prior To Conductive Thermal Treatment Of The Soil," filed Oct. 24, 2001. The above-referenced provisional application is hereby incorporated by reference as if fully set forth herein.

BACKGROUND OF THE INVENTION

1. Field of the Invention

The present invention relates generally to soil remediation. An embodiment of the invention relates to isolation of a treatment area for application of thermal processes such as in situ thermal desorption soil remediation process.

2. Description of Related Art

Contamination of soil has become a matter of concern in many locations. "Soil" refers to unconsolidated and consolidated material in the ground. Soil may include natural formation material such as dirt, sand, and rock, as well as other material, such as fill material. Soil may become contaminated with chemical and/or biological contaminants. Contamination of soil may occur in a variety of ways, such as material spillage, leakage from storage vessels, and landfill seepage. Additional public health concerns arise if the contaminants migrate into aquifers or into air. Soil contaminants may also migrate into the food supply through bioaccumulation in various species in a food chain.

There are many methods to remediate contaminated soil. "Remediating soil" means treating the soil to remove soil contaminants or to reduce contaminants within the soil (e.g., to acceptable levels). A method of remediating a contaminated site is to excavate the soil and to process the soil in a separate treatment facility to eliminate or reduce contaminant levels within the soil. Many problems associated with this method may limit its use and effectiveness. For example, dust generation that accompanies excavation exposes the surrounding environment and workers to the soil contamination. Also, many tons of soil may need to be excavated to effectively treat even a small contamination site. Equipment, labor, transport, and treatment costs may make the method prohibitively expensive compared to other soil remediation methods.

Biological treatment and in situ chemical treatment may also be used to remediate soil. Biological and/or chemical treatment may involve injecting material into the soil, such that the material reacts and/or moves contamination within the soil. A material injected during a biological or chemical treatment may be a reactant configured to react with the soil contamination to produce reaction products that are not contaminated. Some of the reaction products may be volatile. These reaction products may be removed from the soil.

The material injected during a chemical treatment may be a drive fluid configured to drive the contamination toward an extraction well that removes the contaminant from the soil. The drive fluid may be steam, carbon dioxide, or other fluid. Soil heterogeneity and other factors may, however, inhibit uniform reduction of contaminant levels in the soil using biological treatment and/or chemical treatment. Furthermore, fluid injection may result in migration of contaminants into adjacent soil.

Soil vapor extraction (SVE) is a process that may be used to remove contaminants from subsurface soil. During SVE, some vacuum is applied to draw air through the subsurface soil. Vacuum may be applied at a soil/air interface or through vacuum wells placed within the soil. The air may entrain and carry volatile contaminants toward the vacuum source. Off-gas removed from the soil by the vacuum may include contaminants that were within the soil. The off-gas may be transported to a treatment facility. The off-gas removed from the soil may be processed in the treatment facility to eliminate or reduce contaminants within the off-gas. SVE may allow contaminants to be removed from soil without the need to move or significantly disturb the soil. For example, SVE may be performed under roads, foundations, and other fixed structures.

Permeability of subsurface soil may limit the effectiveness of SVE. Air and vapor may flow through subsurface soil primarily through high permeability regions of the soil. The air and vapor may bypass low permeability regions of the soil, allowing relatively large amounts of contaminants to remain in the soil. Areas of high and low permeability may be characterized by, for example, moisture, stratified soil layers, and fractures and material heterogeneities within the soil.

Water may be present within soil. At a certain level within some soil, pore spaces within the soil become saturated with water. This level is referred to as the saturation zone. In the vadose zone, above the saturation zone, pore spaces within the soil are filled with water and gas. The interface between the vadose zone and the saturated zone is referred to as the water table. The depth of the water table refers to the depth of the saturated zone. The saturated zone may be limited by an aquitard. An aquitard is a low permeability layer of soil that inhibits migration of water.

Reduced air permeability due to water retention may inhibit contact of flowing air with contaminants in the soil during SVE soil remediation. Dewatering the soil may partially solve the problem of water retention. The soil may be dewatered by lowering the water table and/or by using a vacuum dewatering technique. These methods may not be effective methods of opening the pores of the soil to admit airflow. Capillary forces may inhibit removal of water from the soil when the water table is lowered. Lowering the water table may result in moist soil, which may limit air conductivity.

A vacuum dewatering technique may have practical limitations. The vacuum generated during a vacuum dewatering technique may diminish rapidly with distance from the dewatering wells. The use of vacuum dewatering may not significantly decrease water retention in the soil. This method may also result in the formation of preferential passageways for air conductivity located adjacent to the dewatering wells.

Many types of soil are characterized by horizontal layering with alternating layers of high and low permeability. A common example of a layered type of soil is lacustrine sediments, characterized by thin beds of alternating silty and sandy layers. Attempts to conduct SVE in such layers results in airflow that occurs substantially within the sandy layers and bypasses the silty layers.

Heterogeneities may be present in soil. Air and vapor may preferentially flow through certain regions or layers of heterogeneous soil, such as gravel beds. Air and vapor may be impeded from flowing through other regions or layers of heterogeneous soil, such as clay beds. Also, for example, air and vapor tend to flow preferentially through voids in poorly compacted fill material. Air and vapor may be impeded from flowing through overly compacted fill material. Buried debris within fill material may also impede the flow of air through soil.

Some components of soil contamination may be toxic. Such soil contamination may include mercury, mercury-containing compounds such as dimethyl mercury; volatile hazardous compounds; and combinations thereof. Placement of wells or use of invasive testing procedures to identify the location and extent of the soil contamination may require special measures to ensure that the surrounding environment and workers are not exposed to contaminated vapor, dust, or other forms of contamination during installation and use of the wells or testing procedures. Such measures may include, but are not limited to, placing dust or vapor producing operations within enclosures to prevent release of contaminants to the environment, treating air within such enclosures to remove or reduce contamination before releasing the air to the environment, equipping workers with appropriate protective clothing, and/or equipping workers with appropriate breathing filters or separate source air supplies.

In some cases, removal of some contaminants from affected soil may be impractical, but removal of other contaminants may be desirable. Removal of some contaminants may be impossible or impractical, but it may be desirable to remove or reduce other contaminants within the soil to inhibit such contamination from migrating to other areas through the soil.

The presence of water within the ground is often a problem for construction projects. The problem of water presence and/or water recharge may have to be overcome for some construction projects. A barrier to water migration into a selected area may be established by forming a freeze wall surrounding the selected area. The use of freeze walls to stabilize soil adjacent to a work site and to inhibit water migration into the work site has been implemented during construction of tunnels and shafts and during excavation work. In a typical application of freeze wells at a work site, freeze wells are inserted into the soil and a wall of frozen water and soil is formed around a selected area. The soil within the selected area is then excavated to form a hole. Supports may prevent the walls defining the hole from falling in. The freeze wall may be allowed to thaw when sufficient support is installed to prevent collapse of the walls. Alternatively, work within the hole formed by the removal of the soil may be completed relying on the frozen wall of water and soil to prevent the hole from collapsing. The frozen wall of water and soil may be allowed to thaw after completion of the work within the well.

U.S. Pat. No. 2,777,679 issued to Ljungström, which is incorporated by reference as if fully set forth herein, describes creating a frozen barrier to define a perimeter of a zone that is to be subjected to hydrocarbon production. Material within the zone is pyrolyzed by convectively advancing a heating front through the material to drive pyrolysis products toward production wells. U.S. Pat. No. 4,860,544 issued to Krieg et al., which is incorporated by reference as if fully set forth herein, describes establishing a closed cryogenic barrier confinement system about a predetermined volume extending downward from or beneath a surface region of Earth, i.e., a containment site.

SUMMARY OF THE INVENTION

Freeze wells may be used to create a barrier at a perimeter of a treatment area of contaminated soil. "Freeze wells" refers to wells or openings in the ground that are used to cool a portion of the formation to temperatures sufficient to freeze water within the ground. "Treatment area" refers to a volume of soil that is to be processed by an in situ soil remediation method. The freeze wells may form a frozen barrier along the perimeter. The barrier may be impermeable. The barrier may inhibit fluid flow into or out of the treatment area. Inhibiting fluid flow out of the treatment area may prevent the spread of contamination from the contaminated soil to uncontaminated soil. Inhibiting fluid flow into the treatment area may reduce the amount of fluid removed from the treatment area. A reduced amount of fluid removed from a treatment area may reduce the size, cost and operational expense of equipment that treats fluid removed from the ground. Inhibiting fluid flow into the treatment area may limit water flow into the treatment area. For an in situ thermal desorption (ISTD) remediation system, inhibiting water flow into a treatment area may make remediating the soil economically viable.

In an embodiment of a system that utilizes freeze wells, the freeze wells solidify water within the soil adjacent to the freeze wells to form an ice barrier between adjacent freeze wells. The freeze wells may be installed into a water saturated zone surrounding a treatment area to be remediated. The freeze wells may form a barrier that inhibits water recharge into the treatment area. Activation of the freeze wells may create a frozen barrier that prevents fluid flow across the barrier. If the soil into which the freeze wells are positioned does not include a significant amount of water in some places, water may be injected from a well or allowed to migrate into the soil from the surface adjacent to the freeze wells so that the freeze wells will freeze the water into a frozen barrier. In an embodiment of a system that utilizes freeze wells, a rise in the water table level within the treatment area defined by the frozen barrier may confirm formation of the frozen barrier. After formation of the barrier around the treatment area, the thickness of the barrier may increase as the barrier expands. The expanding barrier may force a change in piezometric water head within the treatment area. A piezometer or piezometers positioned on an inward side of freeze wells, and a piezometer or piezometers positioned on outward side of the freeze wells may be used to measure water head within the soil to determine when a frozen barrier has been formed.

In other embodiments, integrity of a barrier may be determined using a "drawdown test." After sufficient time has elapsed for formation of an interconnected frozen barrier around a treatment area, a sudden pressure reduction pulse may be generated in the treatment area. The pressure reduction pulse may be generated by drawing a vacuum on a well within the treatment area. Pressure response in monitoring wells outside of the treatment area and/or inside of the treatment area may be used to determine characteristics of the barrier formed by freeze wells. If a frozen barrier has been formed around the treatment area, monitor wells outside of the treatment area should be unaffected by pressure drawdown within the treatment area. Measurement of time responses to a drawdown within the treatment area may be used to measure the thickness and depth of a frozen barrier. The time response may also be used to help identify the position of a breach in the formation. When the position of a breach is found, additional cooling capacity may be directed into adjacent wells by increasing flow rate of refrigerant to the adjacent freeze wells. Alternatively, another freeze well may be inserted into the soil between the freeze wells that contain a breach to generate additional frozen soil that will complete the perimeter barrier.

Suction pumps and/or injectors may be used during formation and/or after formation of a frozen barrier. In a treatment area through which water flows, suction pumps and or injectors may be operated to reduce water flow so that a frozen barrier forms. In an embodiment, suction wells are installed on an inward side and an outward side of where a frozen barrier is to be formed. The suction wells are operated to minimize a pressure differential between the inward suction wells and the outward suction wells so that fluid flow between inward suction wells and outward suction wells is minimized. The freeze wells are activated to form an interconnected low temperature zone that is below a temperature needed to form a frozen barrier. After formation of the low temperature zone, the power supplied to the suction wells may be reduced to allow water or other fluid to enter into the low temperature region between the suction wells. The water or other fluid may freeze within the low temperature zone.

In some soil remediation system embodiments, suction pumps may be used to remove water from the soil before or simultaneously with activation of heater wells within the treatment area. The suction pumps remove water to reduce the amount of water that the heater wells need to vaporize during soil remediation. Water removed from the soil may be treated in a treatment facility to remove or reduce contamination in the water.

Refrigerant in freeze wells may reduce soil temperature between freeze wells low enough to form of a frozen barrier between the freeze wells. Water presence in a low temperature zone may allow for the formation of a frozen barrier. The frozen barrier may be a monolithic, impermeable structure. After the frozen barrier is established, the energy requirements needed to maintain the frozen barrier may be significantly reduced, as compared to the energy costs needed to establish the frozen barrier. In some embodiments, the reduction in cost may be a factor of 10 or more. In other embodiments, the reduction in cost may be less dramatic, such as a reduction by a factor of about 3 or 4.

Freeze wells may be inserted into the ground in a single row around a perimeter, or a portion of a perimeter, of a treatment area. To establish a thicker frozen barrier, two or more rows of freeze wells may be installed around the treatment area. Rows of freeze wells may be staggered to have a short separation distance between the individual freeze wells so that a thick frozen barrier will be formed by the freeze wells. For an in situ thermal desorption (ISTD) remediation system, heater wells and/or extraction wells may be inserted into the ground prior to, simultaneously with, or after insertion of the freeze wells. The freeze wells may be activated prior to the heater wells to allow a frozen barrier to be established before heat is applied to the treatment area. By forming a frozen barrier before initiating heating, the heat front may never overrun and break through the frozen barrier.

A refrigerant may be circulated within freeze wells to form a frozen barrier. Alternatively, a refrigerant may be placed within a well without provision for circulation of the refrigerant. The soil may transfer heat to the refrigerant. The refrigerant may be any type of refrigerant including, but not limited to, a refrigerated brine, such as calcium chloride brine or lithium chloride brine; a cryogenic fluid, such as liquid nitrogen; hydrocarbon refrigerants; a cooled gas such as carbon dioxide, nitrogen, or air; and/or dry ice or a dry ice and liquid (ethanol, glycol or other low freezing point liquid) bath. A vaporization cycle may be used in freeze wells. If the refrigerant is circulated through freeze wells, the refrigerant may be circulated through several wells before the refrigerant is passed through a refrigeration unit or units. The refrigeration unit or units may be used to cool the refrigerant to a desired temperature, or the refrigeration unit may liquefy a fluid if a vaporization cycle is utilized.

A type of refrigeration system and refrigerant chosen for forming a frozen barrier of a soil remediation system may be based on a number of factors. Such factors may include, but are not limited to, time required to form a frozen barrier; economics; coldest and warmest temperature that the refrigerant will be subjected to; environmental concerns related to potential refrigerant releases, leaks, or spills; and temperature needed to form a frozen barrier within the ground. A refrigerant temperature that is significantly colder than the freezing temperature of water (0° C. at standard temperature and pressure) may be needed to compensate for freezing point depression of saline formation fluid.

Freeze wells may be used in conjunction with an in situ thermal desorption soil (ISTD) soil remediation system that raises the temperature of soil within a treatment area to vaporize and/or destroy contaminants within the soil. The freeze wells may form a frozen barrier around a treatment area or a portion of a treatment area. The freeze wells may form a frozen barrier that inhibits temperature elevation of soil on an outward side of the frozen barrier. The frozen barrier may inhibit fluid movement into or out of the treatment area.

Physical properties of soil and water may allow formation of a frozen barrier that will not melt during the application of heat to the soil. Soil heaters may be placed close to the freeze wells without resulting in breakthrough of the frozen barrier established by the freeze wells. Frozen saturated soil typically has a significantly higher thermal diffusivity than hot dry soil. The difference in the thermal diffusivity of hot, dry soil and cold, saturated soil predicts that a cold zone will propagate faster than a hot zone. Fast propagation of a cold zone established and maintained by freeze wells may inhibit a hot zone formed by soil heaters from melting through the cold zone during soil remediation. Another factor allowing the combined use of cold to form a barrier and heat to remediate the soil may be that the cold wells can be initiated to form the frozen barrier prior to initiation of the soil heaters. Factors, such as rate of formation of frozen soil, distance separating the freeze wells and the soil heaters, and/or soil properties may determine the time differential between initialization of freeze wells and soil heaters so that the freeze wells will form a frozen barrier that will not be broken through during remediation of the soil. In embodiments of soil remediation systems, heater wells may be placed as close as about 0.3 m to freeze wells without the heater wells being able to melt through a frozen barrier established by the freeze wells. In other embodiments, heater wells may be placed closer than 0.3 m from freeze wells, or greater than 0.3 m away from freeze wells. In certain embodiments, heater wells may be located 0.6 m or more from freeze wells.

During installation of wells in a treatment area, an outermost ring of heater wells may be positioned in a region in which freeze wells will establish a frozen barrier. Establishing the frozen barrier in advance of initiation of heater wells may inhibit the heater wells from breaking through the barrier in the time that the heater wells will be activated for remediation. In an embodiment of a soil remediation system, freeze wells are placed in two rings around a treatment area, and heater wells are positioned in a region in which an inner ring of the freeze walls will form a frozen barrier. In embodiments of soil remediation systems, a heater well or heater wells may be placed between adjacent freeze wells. For example, a heater well may be placed midway between two adjacent freeze wells.

Controlling the amount of water that flows into a treatment area of an ISTD soil remediation system may be of critical importance. If the soil remediation system is to be operated in a water recharge zone, inflowing water may result in greatly increased energy expenditures associated with vaporizing incoming water. Inflowing water may also result in the inability to raise soil temperature within the treatment area to temperatures greater than the vaporization temperature of water. To inhibit migration of water into a treatment area, freeze wells may only need to stop lateral water migration or flow. Horizontal permeability of soil may be much greater than vertical permeability of the soil, or an aquitard may be present that inhibits upward vertical migration of water within the soil.

In an embodiment of a soil remediation system that utilizes freeze wells, the freeze wells may surround a periphery of a treatment area. In alternative embodiments of soil remediation systems, the freeze wells may only be placed along portions of the perimeters of treatment areas. For example, freeze wells may be placed to form a barrier against water migration along a northern edge of a treatment area, but such a barrier may not be needed along a southern edge of the treatment area.

Freeze wells that form a frozen barrier may be placed in uncontaminated soil, or substantially uncontaminated soil, so that the frozen barrier formed by the freeze wells does not contain significant amounts of contamination. In some soil remediation system embodiments, freeze wells may be formed with heater elements, or refrigeration elements may be removed from a wellbore and heater elements may be installed in wellbores of freeze wells. After completion of remediation of soil on an inward side of the freeze wells and utilization of thermal energy of the freeze wells and barrier, the heater elements may be activated to heat the soil previously frozen. Vapor within the soil may preferentially flow toward extraction wells of the soil remediation system. Also, some or all of the freeze wells converted to heater wells may be extraction wells. Large soil contamination areas may be treated in sections.

In some embodiments of soil remediation systems, it may be desirable to inhibit fluid inflow from below a treatment area. A well pattern may be established within the treatment area with freeze wells placed along a periphery of the treatment area and soil remediation wells within an interior of the treatment area. The soil remediation wells may be heater wells, extraction wells and/or heater/extraction wells. The soil remediation wells may be installed within the soil to a depth at which it is desired to establish a frozen barrier. The depth of the frozen barrier may be 1 m or more below a zone of soil that is contaminated. Refrigeration lines may be installed in the soil remediation wells. The refrigeration lines may include insulation that inhibits heat transfer with the soil except in lower portions of the wells. The refrigeration system may be activated a significant time (several months for example) before activation of the soil remediation system to form a bottom frozen barrier within the treatment area. In an embodiment of the soil remediation system, the refrigeration lines may remain in the wells after the formation of the barrier. The refrigeration lines may or may not be used during a heating phase of the soil remediation process to maintain the bottom frozen barrier. In an alternative embodiment, the refrigeration lines may be removed from the soil remediation wells after formation of the barrier and prior to initiation of heating phase of the soil remediation process.

In some embodiments of soil remediation systems in which inhibiting fluid migration from below is desirable, freeze wells may be installed in a slanted orientation. The freeze wells may be oriented to form a "V" or "U" shaped pattern. In some embodiments, the wells may be positioned in staggered arrangements, or the wells may be directionally drilled to enter a treatment area on a first side and exit the treatment area on a second side of the treatment area. Heater wells and/or thermal blankets may be placed between legs of the "V" or "U" patterns of freeze wells. Vertically positioned freeze wells may be placed along ends of the "V" or "U" shaped pattern.

Freeze wells and soil remediation wells may be installed within a treatment area that is to be remediated. The extent of the treatment area may be based on the extent of a known spill, or based on the extent of contamination determined from soil sampling or monitoring wells. A soil remediation system may be installed within the treatment area. The soil remediation system may include heater blankets placed on top of the treatment area and/or heater wells installed into the treatment area. Freeze wells may be installed around the perimeter, or along selected portions of the perimeter, of the treatment area.

A drive fluid may be used in conjunction with a soil remediation system that utilizes freeze wells. The drive fluid may be used to move contaminants within the soil toward extraction wells. In certain embodiments, some extraction wells may be converted to injection wells to allow a drive fluid to be injected into the soil by detaching the wells from the vacuum system and attaching the wells to an injection system. A ring of extraction wells may be converted to injection wells. After the drive fluid is injected into the soil through the wells, the injection wells may be converted back to extraction wells by reattaching the wells to the vacuum system. A drive fluid may be utilized near an end of a soil remediation process to sweep residual contamination toward extraction wells so that the contamination may be removed from the soil. Increased permeability within the soil due to heating the soil may facilitate removal of residual contamination using a drive fluid. In some embodiments, some soil remediation wells may be injection wells coupled to an injection system so that no extraction wells need to be converted to injection wells during remediation.

After contamination within a treatment area is removed or reduced to acceptable levels, a soil remediation system and initial freeze wells may be deactivated. If a new barrier is to be formed around a second treatment area, heat may be transferred between the soil in which a new barrier is to be formed and the initial freeze wells using a circulated heat transfer fluid. Using deactivated freeze wells to cool soil in which a frozen barrier is to be formed may allow for recovery of some of the energy expended to form and maintain the initial barrier. Using the initial barrier to cool soil in which a new frozen barrier is to be formed may significantly decrease a cost of forming the new barrier. A frozen barrier that is to be thawed, a maintained frozen barrier, and/or a portion of an output stream from a refrigeration unit may be utilized to provide cooling for a condensate trap and/or fluid separation system. In some soil remediation embodiments, a frozen barrier may be allowed to naturally reach thermal equilibrium with surrounding soil. Freeze wells may be removed from the ground after soil remediation. The freeze wells or parts of the freeze wells may be reused at other locations.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
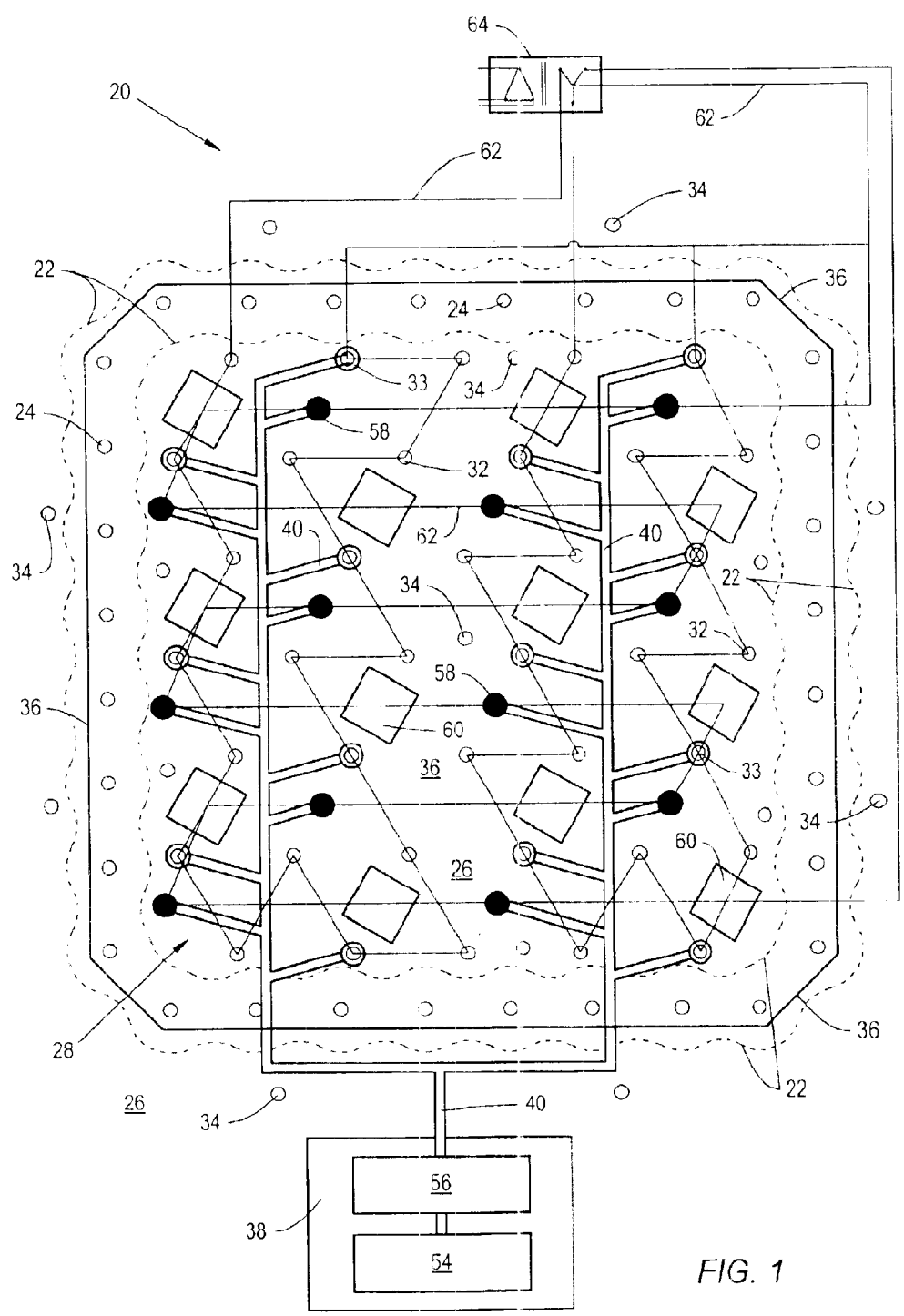
FIG. 1 depicts a schematic representation of a soil remediation system embodiment with a freeze wall formed by batch operated freeze wells.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF PREFERRED EMBODIMENTS

An in situ thermal desorption (ISTD) process system may be used to remediate contaminated soil. An ISTD soil remediation process involves in situ heating of the soil to raise the temperature of the soil while simultaneously removing off-gas by vacuum. Heating the soil may result in removal of contaminants by a number of mechanisms. Such mechanisms may include, but are not limited to: vaporization and vapor transport of the contaminants from the soil; evaporation and entrainment and removal of contaminants into an air or water vapor stream; and/or thermal degradation or conversion of contaminants into non-contaminant compounds by pyrolysis, oxidation, or other chemical reactions within the soil.

An ISTD soil remediation process may offer significant advantages over soil vapor extraction (SVE) processes and processes that depend on the injection of drive fluids, chemical reactants, and/or biological reactants into the soil. Fluid flow conductivity of an average soil may vary by a factor of $10^8$ throughout the soil due in part to soil heterogeneities and water within the soil. As used herein, "fluid" refers to matter that is in a liquid or gaseous state. Mass transport of fluid through the soil may be a limiting factor in the remediation of a treatment site using an SVE process or a chemical and/or biological treatment of the soil. In contrast to the extremely large variation in fluid flow permeability of soil, thermal conductivity of an average soil may vary by a factor of about two throughout the soil. Injecting heat into soil may be significantly more effective than injecting a fluid through the same soil. Furthermore, injecting heat into soil may result in a preferential increase in the permeability of tight (low permeability) soil. Injected heat may dry the soil. As the soil dries, microscopic and macroscopic permeability of the soil may increase. The increase in permeability of heated soil may allow an ISTD soil remediation process to remove or reduce contaminants to acceptable levels throughout a treatment area. The increase in soil permeability may allow in situ remediation of low permeability clays and silts that are not amenable to standard soil vapor extraction processes.

In a soil remediation embodiment, a method of decontamination includes heating the contaminated soil to temperatures at which the contaminants are removed by vaporization and/or thermal destruction. In situ water may vaporize and steam distill or entrain contaminants. The contaminants in the water vapor may be removed from the soil through extraction wells.

Soil may be heated by a variety of methods. Methods for heating soil include, but are not limited to, heating by thermal radiation or conduction from a heat source, heating by radio frequency heating, or heating by electrical soil resistivity heating. "Radiative heating" refers to radiative heat transfer from a hot source to a colder surface. In the ISTD process, heat is then transferred primarily by conduction from the heated soil surface to adjacent soil, thereby raising the soil temperature at some distance from the heat source. Radiative and/or conductive heating may be advantageous because temperatures obtainable by such heating are not limited by the amount of water present in the soil. Soil temperatures substantially above the boiling point of water may be obtained using radiative and/or conductive heating. Soil temperatures of about 100° C., 125° C., 150° C., 200° C., 400° C., 500° C. or greater may be obtained using radiative and/or conductive heating. The heat source for radiative and/or conductive heating may be, but is not limited to, an electrical resistance heater placed in a wellbore, a heat transfer fluid circulated through a wellbore, or combustion within a wellbore.

Heaters may be placed in or on the soil to heat the soil. For soil contamination within about 1 m of the soil surface, thermal blankets and/or ground heaters placed on top of the soil may apply conductive heat to the soil. A vacuum system may draw a vacuum on the soil through vacuum ports that pass through the thermal blanket. The heaters may operate at about 870° C. U.S. Pat. No. 5,221,827 issued to Marsden et al., which is incorporated by reference as if fully set forth herein, describes a thermal blanket soil remediation system. U.S. Pat. No. 4,984,594 issued to Vinegar et al., which is incorporated by reference as if fully set forth herein, describes an in-situ method for removing contaminants from surface and near-surface soil by imposing a vacuum on the soil beneath a impermeable flexible sheet and then heating the soil with an electric surface heater that is positioned on the soil surface under the sheet.

For deeper contamination, heater wells may be used to supply heat to the soil. U.S. Pat. No. 5,318,116 and U.S. patent application Ser. No. 09/549,902 to Vinegar et al. and U.S. Pat. No. 6,632,047 to Vinegar et al., each of which is incorporated by reference as if fully set forth herein, describe ISTD soil remeditation processes for treating contaminated subsurface soil with radiative and/or conductive heating. U.S. Pat. No. 6,688,387 to Wellington et al,; U.S. patent Publication No. 2003-0136558 to Wellington et al.; and U.S. patent application Publication No. 2003-0192691also describe heaters and various equipment. Each of these applications is incorporated by reference as if fully set forth herein.

Some heater wells may include perforated casings that allow fluid to be removed from the soil. A heater well with a perforated casing may also allow fluid to be drawn or injected into the soil. Vacuum may be applied to the soil to draw fluid from the soil. The vacuum may be applied at the surface or through extraction wells placed within the soil.

The term "wells" refers to heater wells, extraction wells, injection wells, and test wells. Soil temperature may be raised using heater wells. Fluid from the soil may be withdrawn from the soil through extraction wells. Some extraction wells may include heater elements. Such extraction wells, which are referred to as "heater-extraction wells", are capable of both raising soil temperature and removing fluid from the soil. In a region adjacent to a heater-extraction well, heat flow may be counter-current to fluid flow. Fluid withdrawn from the heater-extraction well may be exposed to a high enough temperature within the heater-extraction well to result in the destruction of some of the contaminants within the fluid. Injection wells allow a fluid to be inserted into the soil. Sampling or logging of the soil or fluid from the soil may be performed using test wells that are positioned at desired locations within a well pattern of a soil remediation system.

An in situ soil remediation system may include a plurality of heater wells and at least one vapor extraction well. A vapor extraction well may also include one or more heater elements. Heater-vapor extraction well heater elements may provide heat for establishing an initial permeability in the vicinity of the vapor extraction well. The additional heat may also prevent condensation of water vapor and contaminants in the well. In some extraction well embodiments, the extraction wells may not include heater elements. Absence of heater elements within the vapor extraction well may simplify the design of the vapor extraction wellbore, and may be preferred in some applications.

Wells may be arranged in a pattern of rows and columns within the soil. Rows of wells may be staggered so that the wells are in a triangle pattern. Alternatively, the wells may be aligned in a rectangle pattern, pentagon pattern, hexagon pattern, or higher order polygon pattern. A distance between adjacent wells may be a substantially fixed distance so that a polygon well pattern may be made up of regular arrays of equilateral triangles or squares. A spacing distance between adjacent wells of a pattern may range from about 1 m to about 12 m or more. A typical spacing distance may be from about 2 m to 4 m. Some wells may be placed out of a regular pattern to avoid obstructions within the pattern.

An ISTD soil remediation process may have several advantages over an SVE system. Heat added to the contaminated soil may raise the temperature of the soil above the vaporization temperatures of contaminants within the soil. If the soil temperature exceeds the vaporization temperature of a soil contaminant, the contaminant may vaporize. Vacuum applied to the soil may be able to draw the vaporized contaminant out of the soil. Even heating the soil to a temperature below vaporization temperatures of the contaminants may have beneficial effects. Increasing the soil temperature may increase vapor pressures of the contaminants in the soil and allow an air stream to remove a greater portion of the contaminants from the soil than is possible at lower soil temperatures. Increased permeability of the soil due to heating may allow removal of contaminants throughout a soil treatment area.

U.S. patent Publication No. 2004-0126190; U.S. patent application Publication No. 2003-0110794; and U.S. patent Publication No. 2004-0120771 describe ISTD soil remediation processes. Each of these references is incorporated by reference as if fully set forth herein.

Many soil formations include a large amount of water as compared to contaminants. Raising the temperature of the soil to the vaporization temperature of water may vaporize the water. The water vapor may help volatize (by steam distillation) and/or entrain contaminants within the soil. Vacuum applied to the soil may remove the volatized and/or entrained contaminants from the soil. Vaporization and entrainment of contaminants may result in the removal of medium and high boiling point contaminants from the soil.

In addition to allowing greater removal of contaminants from the soil, the increased heat of the soil may result in the destruction of contaminants in situ. The presence of an oxidizer, such as air or water vapor, may result in the oxidation of the contaminants that pass through high temperature soil. In the absence of oxidizers, contaminants within the soil may be altered by pyrolysis. Vacuum applied to the soil may remove reaction products from the soil.

A heating and vapor extraction system may include heater wells, extraction wells, injection wells, and/or test wells. Heater wells apply thermal energy to the soil to increase soil temperature. Extraction wells or a heating and vapor extraction system may include perforated casings that allow off-gas to be removed from the soil. The casing or a portion of the casing may be made of a metal that is resistant to chemical and/or thermal degradation. Perforations in a well casing may be plugged with a removable material prior to insertion of the casing into the ground. After insertion of the casing into the ground, the plugs in the perforations may be removed. U.S. Pat. No. 6,543,539, which is incorporated by reference as if fully set forth herein, describes wells that are installed with removable plugs placed within perforations of the well casings. Perforations in a well casing may be, but are not limited to, holes and/or slots. The perforations may be screened. The casing may have several perforated zones at different positions along a length of the casing. When the casing is inserted into the soil, the perforated zones may be located adjacent to contaminated layers of soil. The areas adjacent to perforated sections of a casing may be packed with gravel or sand. The casing may be sealed to the soil adjacent to non-producing soil layers to inhibit migration of contaminants into uncontaminated soil.

FIG. 1 depicts a schematic representation of soil remediation system 20. The soil remediation system may include barrier 22 formed by freeze wells 24 around a perimeter of the remediation system 20. The remediation system 20 may be used to treat soil 26 within treatment area 28. Soil 26 may include contaminated soil and uncontaminated soil. Soil remediation system 20 may remove contamination or reduce contaminants within treatment area 28 to acceptable levels. Freeze wells 24 may form barrier 22 around treatment area 28 by freezing water in soil 26. In some remediation system embodiments, natural barriers (such as overburden, underburden, and substantially impermeable soil) and/or artificial barriers (such as impermeable walls and inserted metal sheets) may allow freeze wells to be positioned around less than an entire perimeter of a treatment area. Barrier 22 may inhibit fluid flow into or out of treatment area 28. Barrier 22 may advantageously inhibit migration of contamination out of treatment area 28 during remediation. Barrier 22 may inhibit flow of fluid, such as water and/or air, into treatment area 28. Inhibiting fluid flow into treatment area 28 may limit a size of a treatment facility needed to process contamination removed from the soil by limiting a volume of material removed from the ground.

Soil remediation system 20 may be, but is not limited to, a biological or reactant fluid injection system, a soil vapor extraction system, or an in situ thermal desorption (ISTD) remediation system. An ISTD soil remediation system may use, but is not limited to using, thermal blankets, heater wells, radio frequency heating, and/or soil electrical resistivity heating to raise soil temperature. Electrical resistivity heating may utilize 6-phase or 3-phase heating of the soil. FIG. 1 depicts an embodiment of an ISTD soil remediation system that uses thermal blankets and heater wells. For an ISTD soil remediation system, limiting an amount of water that is in treatment area 28, or able to enter the treatment area may significantly reduce energy consumption and may allow the system to raise the soil temperature throughout the treatment area to temperatures significantly higher than the vaporization temperature of water.

Remediation system 20 may include one or more soil remediation wells. Soil remediation wells may be extraction wells 30, heater wells 32, or combination heater-extraction wells 33. Extraction wells 30 allow off-gas to be removed from soil 26. Extraction wells 30 include an opening or openings in communication with soil 26 that allow off-gas to be drawn into the extraction wells. Heater wells 32 transfer heat into soil 26. Heat may be applied to the soil, but is not limited to being applied to the soil, from electrical heating elements, from combustion in a wellbore, and from heat transfer with a circulated heat transfer fluid. Heat applied to the soil may transfer to adjacent soil substantially by conduction. Heater-extraction wells may allow for heat transfer to the soil as well as removal of off-gas from the soil.

Soil remediation wells may also be injection wells. Injection wells may be used to add fluid to soil 26. Injection wells include one or more openings in communication with soil 26 that allow fluid to pass from the injection well into the soil. The fluid may be a biological agent, a chemical reactant, and/or a flooding agent that drives fluid toward extraction wells 30. In an embodiment, fluid may be pumped into the soil through injection wells. In alternative embodiments, fluid may be placed in injection wells, and the fluid may be drawn into the soil by vacuum drawn on soil 26 at extraction wells 30. During soil remediation, some extraction wells 30 may be converted to injection wells. To convert an extraction well into an injection well, the extraction well may be detached from a vacuum system and connected to a fluid supply system that introduces the fluid into the converted well.

Remediation system 20 may include one or more test wells 34. Test wells 34 may be used to monitor the progress of remediation. Test well 34 may be a logging port that allows collection of temperature data, pressure data, samples, and/or concentration data of chemical components within the soil. Test wells 34 may be located inside and/or outside of a pattern of extraction wells 30.

Some test wells 34 may be piezometers. In an embodiment of a soil remediation system that utilizes freeze wells to form frozen barrier 22, a rise in water table level within treatment area 28 defined by the frozen barrier may confirm formation of the frozen barrier. After formation of barrier 22 around treatment area 28, the thickness of the barrier may increase as the barrier expands. The expanding barrier may force a change in piezometric water head within treatment area 28. A piezometer or piezometers positioned on an inner side of a ring of freeze wells 24, and a piezometer or piezometers positioned on an outer side of the ring of freeze wells may be used to measure water head within soil 26 to determine when the frozen barrier has been formed. A rise in water head in treatment area 28 may indicate formation of barrier 22.

Test well 34 may include a temperature sensor. The temperature sensor may be, but is not limited to, a thermocouple or a resistance temperature detector (RTD). An RTD may provide accuracy and stability over a wide temperature range, including temperatures near a freezing point of water saturated soil. Test well 34 may include more than one temperature sensor. The position of the temperature sensors in test wells may be adjustable to measure temperature within the soil as a function of depth. Test wells 34 located near soil remediation wells and frozen barrier 22 may include temperature sensors that measure temperature of soil influenced by the frozen barrier and temperature of soil influenced by soil remediation wells. For example, a test well may be a 7.6 cm wellbore placed in the soil. A first sensor may be positioned in the wellbore against a side of the wellbore that is closest to the frozen barrier. A second sensor may be positioned in the wellbore against a side of the wellbore that is closest to a soil remediation well.

Measurable properties and/or testing procedures may indicate formation of a frozen barrier. For example, if dewatering is taking place on an inner side of freeze wells, the amount of water removed from the formation through dewatering wells may significantly reduce as a frozen barrier forms and blocks recharge of water into a treatment area. Water removal within a treatment area may quickly stop after a frozen barrier is formed and fluid levels have been pumped down.

Transient pressure testing (e.g., drawdown tests or injection tests) in the treatment area may indicate formation of a frozen barrier. Such transient pressure tests may also indicate the permeability at the barrier. Pressure testing is described in *Pressure Buildup and Flow Tests in Wells* by C. S. Matthews & D. G. Russell (SPE Monograph, 1967).

A transient fluid pulse test may be used to determine or confirm formation of a perimeter barrier. A treatment area may be saturated with water after formation of a perimeter barrier. A pulse may be instigated inside a treatment area surrounded by the perimeter barrier. The pulse may be a pressure pulse that is produced by pumping fluid (e.g., water) into or out of a wellbore. Pumping fluid out of the soil may be desirable to inhibit migration of any material out of the treatment area. In some embodiments, the pressure pulse may be applied in incremental steps, and responses may be monitored after each step. After the pressure pulse is applied, the transient response to the pulse may be measured by, for example, measuring pressures at monitor wells and/or in the well in which the pressure pulse was applied. Monitoring wells used to detect pressure pulses may be located outside and/or inside of the treatment area.

In some embodiments, a pressure pulse may be applied by drawing vacuum on the soil through a wellbore. If a frozen barrier is formed, a portion of the pulse will be reflected by the frozen barrier back toward the source of the pulse. Sensors may be used to measure response to the pulse. In some embodiments, a pulse or pulses are instigated before freeze wells are initialized. Response to the pulse or pulses is measured to provide a base line for future responses. After formation of a perimeter barrier, a pressure pulse initiated inside of the perimeter barrier should not be detected by monitor wells outside of the perimeter barrier. Reflections of the pressure pulse measured within the treatment area may be analyzed to provide information on the establishment, thickness, depth, and other characteristics of the frozen barrier.

If tests indicate that a frozen perimeter barrier has not been formed by freeze wells, the location of incomplete sections of the perimeter barrier may be determined. Pulse tests may indicate the location of unformed portions of a perimeter barrier. Tracer tests may indicate the general direction in which there is an incomplete section of perimeter barrier.

Temperature of freeze wells may be monitored to determine the location of an incomplete portion of a perimeter barrier around a treatment area. In some freeze well embodiments, (such as the embodiment depicted in FIG. 7), each freeze well 24 may include port 35. Temperature probes, such as resistance temperature devices, may be inserted into ports 35. Refrigerant flow to the freeze wells may be stopped. Vacuum may be drawn within the treatment area to draw fluid past the perimeter barrier. The temperature probes may be moved within ports 35 to monitor temperature changes along lengths of the freeze wells. The temperature may rise quickly adjacent to areas where a frozen barrier has not formed. After the location of the portion of perimeter barrier that is unformed is determined, refrigerant flow through freeze wells adjacent to the area may be increased and/or an additional freeze well or freeze wells may be installed near the area to allow for completion of a frozen barrier around the treatment area.

As shown in FIG. 1, remediation system 20 may include ground cover 36, treatment facility 38, vapor collection system 40, control system, and a plurality of remediation wells. The remediation wells may be extraction wells, heater wells, injection wells, heater-extraction wells, or other types of wells used for soil remediation. Remediation system 20 may also include freeze wells 24 and/or test wells 34. Ground cover 36 may be placed over a treatment area to inhibit heat loss and vapor loss to the atmosphere from treatment area 28. Ground cover 36 may inhibit excess air from being drawn into soil 26 from the atmosphere. Ground cover 36 may inhibit water inflow from the surface into the soil within treatment area 28.

Figure 2:
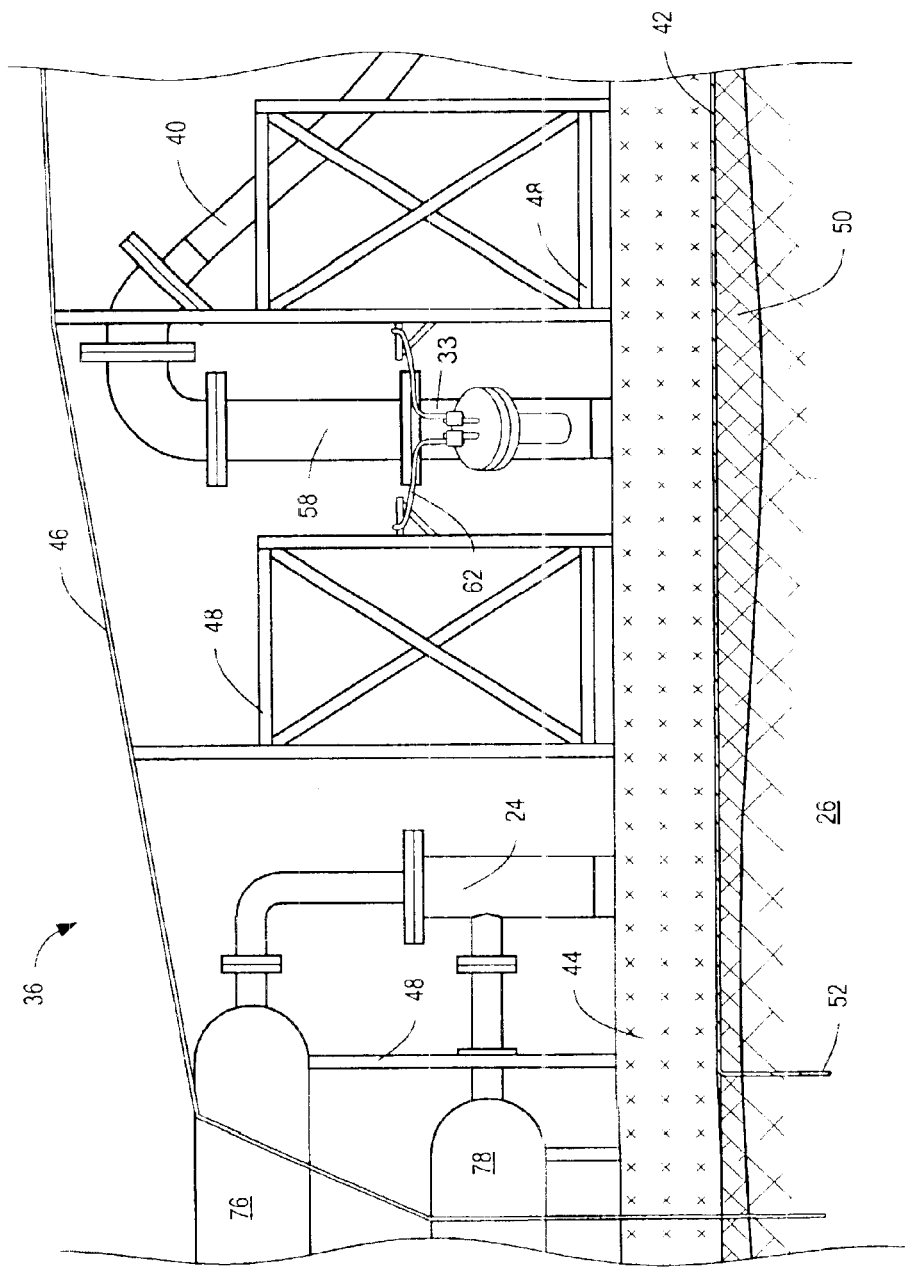
FIG. 2 depicts a cross-sectional representation of a ground cover of a soil remediation system.

FIG. 2 shows components of an embodiment of ground cover 36. Ground cover 36 may include metal sheet layer 42, insulation 44, impermeable layer 46, and framework 48. Fill material 50, such as gravel or sand, may be placed and graded at ground surface to level the treatment area. Metal sheet layer 42 may be placed on top of fill material 50. Soil remediation wells, risers that allow a vacuum to be drawn on the soil surface, and test wells may be placed through openings formed in metal sheet layer 42.

Metal sheet layer 42 may be formed from a number of separate sections that are welded, sealed with high temperature sealant, or otherwise coupled together to form a layer that inhibits fluid escape from treatment area 28 and fluid entry into the treatment area. Metal sheet layer 42 may be sealed by welds, high temperature sealant or other sealing methods to soil remediation wells, risers that allow a vacuum to be drawn on the surface, or other equipment that extends through the metal sheet layer. Metal sheet layer 42 may be sealed to frozen barrier 22 surrounding treatment area 28. Lip 52 along a perimeter of metal sheet layer 42 may be driven into wet soil. When freeze wells 24 are activated, the wet soil adjacent to lip 52 may freeze to seal frozen barrier 22 formed by freeze wells 24 to metal sheet layer 42. Sealing barrier 22 to metal sheet layer 42 may inhibit fluid from being drawn into treatment area 28 from areas adjacent to the treatment area. Inhibiting fluid inflow may allow a vacuum system to draw a high vacuum on the soil within treatment area 28 during remediation. The high vacuum may promote removal of contaminants within treatment area 28 during soil remediation.

Metal sheet layer 42 and other components of an ISTD soil remediation system may be raised to high temperatures during soil remediation. Materials used to form components of an ISTD soil remediation system may be made of materials that are resistant to amalgamation (if mercury is present in the soil) and are resistant to chemical and/or thermal degradation. In an embodiment of an ISTD soil remediation system, the metal sheet layer is carbon steel. In some soil remediation embodiments, chlorinated compounds may decompose to form hydrogen chloride. The metal sheet layer and piping that is raised to high temperatures may be formed of a more chemically resistant steel or other metal than carbon steel. In an embodiment, the metal used may be 316 stainless steel. When the temperature of off-gas is reduced below a working temperature limit of plastic piping, a vapor collection system may use plastic piping. Polymer piping, such polyvinyl chloride piping, may be more chemically resistant and less expensive than metal piping. In soil remediation systems that are not heated, materials used to form components of the soil remediation system may be made of materials sufficient to withstand operating conditions and chemical exposure during soil remediation. For example, a chemically resistant polymer layer may be substituted for the metal sheet layer of an ISTD soil remediation system if the soil remediation system is a biological and/or chemical reactant soil remediation system.

As shown in FIG. 2, ground cover 36 may include insulation 44 that is placed on top of or below metal sheet layer 42. Placing insulation 44 above metal sheet layer 42 may advantageously inhibit contamination of the insulation. Insulation 44 may inhibit heat loss to the atmosphere during soil remediation. The insulation may be any type of high temperature insulation. The insulation may be, but is not limited to, mineral insulation, glass fiber insulation, or vermiculite insulation. In an embodiment, the insulation is vermiculite insulation that is blown around framework 48. The insulation may extend over a frozen barrier formed by freeze wells 24 to inhibit heat transfer from the atmosphere to the frozen barrier.

In the embodiment shown in FIG. 2, ground cover 36 includes impermeable layer 46 that extends over a soil remediation system. Impermeable layer 46 may be a back-up layer for metal sheet layer 42 to inhibit vapor release to the atmosphere. The impermeable layer may be placed over, or be sealed to, piping, risers, wiring conduits, and other equipment of a soil remediation system. A portion of impermeable layer 46 may be inserted into wet soil so that the impermeable layer is sealed to a frozen barrier when freeze wells 24 form the barrier. Impermeable layer 46 may inhibit rainwater or other fluid from coming into contact with insulation 44, metal sheet layer 42, and/or portions of soil remediation wells, test wells, and heaters placed in a treatment area. Impermeable layer 46 may be, but is not limited to, metal, canvas, polymer, or combinations thereof. Impermeable layer 46 may be sloped to inhibit pooling of water on top of the impermeable layer. Condensate that forms on an inner surface of the impermeable layer may be directed to condensate traps. If a condensate trap collects a significant amount of condensate, the condensate may be tested for contamination. If the condensate contains contaminants, the condensate may be introduced into a treatment facility of the soil remediation system or transported to an off-site treatment facility.

A vacuum may be drawn between metal sheet layer 42 and impermeable layer 46 during soil remediation. An exit stream from the vacuum system may be monitored for contamination. If contamination is found, the stream may be diverted to a treatment facility. The vacuum may reduce heat transfer from the metal sheet layer.

Framework 48 may be part of ground cover 36. Framework 48 may inhibit compression and/or disruption of insulation 44 placed on metal sheet layer 42. Framework 48 may support wells and other structures placed within a treatment area. Framework 48 may support a walkway that provides access to soil remediation wells and/or test wells. Impermeable layer 46 may be supported on portions of framework 48.

A ground cover may not be necessary in some soil remediation system embodiments. A ground cover may not be required if the contaminated soil is so deep and/or there are intervening impermeable layers between the surface and the contamination such that heating the soil and removing off-gas from the soil will have negligible effect at the soil surface.

Treatment facility 38, depicted in FIG. 1, may include vacuum system 54 that draws an off-gas stream from soil 26. Treatment facility 38 may also include contaminant treatment system 56 for treating contaminants within the off-gas. Contaminant treatment system 56 may eliminate contaminants from the off-gas stream, or the contaminant treatment system may reduce the contaminants to acceptable levels. Contaminant treatment system 56 may include, but is not limited to, condensers, liquid-vapor separators, a reactor system, such as a thermal oxidation reactor; a mass transfer system, such as activated carbon beds; or a combination of reactor systems and mass transfer systems.

Vapor collection system 40 may include a piping system that transports off-gas removed from soil 26 to treatment facility 38. The vapor collection system may also include risers 58 that allow a vacuum to be drawn at the soil surface. Vapor collection system 40 may be coupled to vacuum system 54 and to extraction wells 30. In an embodiment, the piping is thermally insulated and heated. The insulated and heated piping inhibits condensation of off-gas within the piping. In alternative embodiments, portions of the piping after risers may be un-heated piping and/or un-insulated piping so that off-gas condenses within the piping and flows to a treatment facility. In some embodiments, piping of the vapor collection system may be formed of several different materials. Piping in hot areas, such as areas adjacent to extraction wells, may be formed of metal. Piping in less hot areas may be formed of metal or plastic. Portions of a piping system may be formed of flexible tubing. The flexible tubing may include internal structure that inhibits collapse due to vacuum drawn through the flexible tubing. Flexible tubing may reduce cost and make installation of a vapor collection system significantly easier than installation of a system that utilizes rigid piping.

A control system for a soil remediation system may be a computer control system. The control system may monitor and control the operation of treatment facility 38, heated vapor collection system 40, and a plurality of soil remediation wells. The control system may monitor and control power input into heater wells 32. The control system may also control injection wells and/or test wells 34.

Remediation system 20 may include heaters that supply thermal energy to soil 26. Thermal energy may be supplied to soil 26 from some or all soil remediation wells placed within the soil. Alternatively, thermal energy may be supplied to soil 26 from ground heaters 60 placed on or below ground cover 36. In some soil remediation systems, thermal energy may be supplied to soil 26 from heater wells 30 and from ground heaters 60. Ground heaters that are used in combination with heater wells may inhibit condensation of off-gas on a ground cover and/or soil surface. Thermal energy may be supplied to soil 26 by, but is not limited to being supplied by, radio frequency heating, supplying electrical current into the soil to resistively heat the soil, radiatively heating the soil from a heat source, thermally conducting heat to the soil from a heat source, and/or combinations thereof. In an embodiment of soil remediation system 20, electricity is used to resistively heat a heater element or heater elements placed within a wellbore of heater well 32. Heater elements may be coupled by wiring 62 to power source 64. In an embodiment of an ISTD system, power source 64 is a transformer or series of transformers that draw electricity from an electrical grid. Heat generated in heater well 32 may be radiatively and/or conductively transmitted to soil 26 near the well. The heat transferred to soil 26 from heater well 32 may transfer to soil farther away from the well primarily by conduction. In an embodiment, one or more burners combust fuel, and the heat generated by combustion is used to heat soil 26. The combustion may take place at or above the ground surface or within a well in the ground.

Soil remediation wells may be placed in a desired pattern within treatment area 28 of a soil remediation system 20.

The pattern of soil remediation wells may be, but is not limited to, a triangle well pattern or a square well pattern. Superposition of heat from soil remediation wells may promote efficient and uniform heating, or substantially uniform heating, throughout treatment area 28. Embodiments of soil remediation systems may be designed to raise the soil temperature to about 100° C., to about 300° C., to about 500° C., or to a higher temperature. The temperature of the soil may be raised to a temperature that will result in removal and/or destruction of contaminants within the soil. Spacing between centers of soil remediation wells may range from about 0.6 m to 6 m or more. The spacing may be dependent on a number of factors including, but not limited to, desired time for remediation, composition of the soil, physical properties of the soil, type of contaminant within the soil, physical and chemical properties of the contamination, and the size of the area to be remediated. A typical spacing between soil remediation wells may be from about 2 m to about 4 m. The soil remediation wells may be heater-extraction wells 33. In other embodiments, the soil remediation wells may be combinations of separate heater wells 32, separate extraction wells 30, and/or separate heater-extraction wells 33.

A ring or rings of heater wells 32 may surround extraction well 30 or a heater-extraction well 33. As depicted in FIG. 1, heater wells 32 may be placed in the soil in a hexagon pattern, and heater-extraction wells 33 may be placed in an equilateral triangle pattern with the heater-extraction wells positioned at centers of hexagons in the heater well hexagon pattern. The spacing between heater wells 32 may be about 2.4 m. In an alternative embodiment, all soil remediation wells are heater-extraction wells.

Heater wells may be cheaper to produce and install than extraction wells, which may be cheaper to produce and install than heater-extraction wells. Limiting a number of extraction wells and/or heater-extraction wells may be desirable in a soil remediation system. In an embodiment of a remediation system, extraction wells may be positioned at or near centroids of patterns of surrounding heater wells. For example, as illustrated in FIG. 1, extraction well 30 may be positioned substantially at a centroid of three heater wells 32 placed in an equilateral triangle pattern. Heater-extraction wells 33 may be placed adjacent to freeze wells 24.

Freeze wells 24 may define a perimeter of soil remediation system 20. Freeze wells 24 may form barrier 22 to fluid flow into and out of a treatment area. In some soil remediation systems, freeze wells may form a ring around treatment area 28. In other soil remediation systems, freeze wells may only be placed along selected sides of a treatment area where it is desired to inhibit fluid flow into or out of the treatment area. Natural barriers, such as impermeable rock formations, and non-natural barriers may be located along other portions of a perimeter of a treatment area. Non-natural barriers may include, but are not limited to, sheets placed in the soil along a portion of a treatment area perimeter and grout walls formed along a portion of a treatment area perimeter.

Physical properties of soil and water may allow formation of a frozen barrier that will not melt during the application of heat to the soil. Soil heaters may be placed close to the freeze wells without resulting in breakthrough of the frozen barrier established by the freeze wells. Frozen, saturated soil typically has a significantly higher thermal diffusivity than hot, dry soil. The difference in the thermal diffusivity of hot, dry soil and cold, saturated soil predicts that a cold zone will propagate faster than a hot zone. Fast propagation of a cold zone established and maintained by freeze wells may inhibit a hot zone formed by soil heaters from melting through the cold zone during soil remediation. Another factor allowing the combined use of cold to form a frozen barrier and heat to remediate the soil may be that the freeze wells can be initiated to form the frozen barrier prior to initiation of the soil heaters. Factors, such as rate of formation of frozen soil, distance separating the freeze wells and the soil heaters, and soil properties may determine the timing of freeze well initiation relative to the soil heaters so that the freeze wells will form a frozen barrier that will not be broken through during remediation of the soil. In embodiments of soil remediation systems, heater wells may be placed as close as about 0.3 m to freeze wells without the heater wells being able to melt through a frozen barrier established by the freeze wells during time for remediation. In other embodiments, heater wells may be placed closer than 0.3 m from freeze wells, or greater than 0.3 m away from freeze wells. In certain embodiments, heater wells may be located 0.6 m or farther from freeze wells.

A frozen barrier formed by freeze wells may encompass some soil remediation wells prior to initiation of the soil remediation wells. Initiation of the soil remediation wells may allow the soil remediation wells positioned within the frozen soil to thaw the soil and remediate the soil up to the extent of the frozen barrier that the soil remediation wells cannot thaw.

A freeze well and/or soil remediation well may be inserted into the ground in any manner. A unit or units used to insert soil remediation wells may also be used to insert freeze wells. A well may be formed or inserted into an augered or drilled hole, vibrated into the ground, buried within a trench dug in the ground, or impacted into the ground. Vibrating or impacting a well into the ground may advantageously eliminate or reduce an amount of dust, cuttings, and other material removed from the ground during insertion of freeze wells and soil remediation wells. Eliminating or reducing dust, cuttings, and other material removed during insertion of wells may minimize worker exposure to contamination and may reduce the need for special measures and procedures for containing and treating contaminants removed from the soil during insertion of the wells.

Some freeze well embodiments and soil remediation well embodiments may include well casings. Well casings may be formed from standard piping that is threaded and or welded together and positioned in a wellbore using a drilling rig. Well casings typically range from about 5 cm to about 15 cm in diameter. Larger or smaller well casings may be used to meet specific site requirements.

In an embodiment, well casings may be installed by coiled tubing installation. Coiled tubing installation may reduce a number of welded and/or threaded connections in a length of casing. Welds and/or threaded connections in coiled tubing may be pre-tested for integrity. Coiled tubing is available from Quality Tubing, Inc. (Houston, Tex.) and other manufacturers. Coiled tubing may be available in many sizes and different materials. Sizes of coiled tubing may range from about 2.5 cm to about 15 cm. Coiled tubing may be available in a variety of different metals, including carbon steel. Coiled tubing may be spooled on a large diameter reel. The reel may be carried on a coiled tubing unit. Suitable coiled tubing units are available from Fleet Cementers, Inc. (Cisco, Tex.), and Halliburton Co. (Duncan, Okla.). An endcap may be threaded and/or welded on the coiled tubing if the casing is to be a sealed casing. Coiled tubing is unwound from the reel, passed through a straightener, and inserted in a wellbore. After insertion, the coiled tubing may be cut from the coiled tubing on the reel.

Some embodiments of freeze wells include elements (such as inlet conduits) positioned within casings. The elements may be positioned within the casing before the casing is wound on the reel. If the coiled tubing includes elements positioned within a casing, a single installation procedure may be used to place the freeze well into the soil. Alternatively, casings may be installed using coiled tubing installation, and the elements may be subsequently installed in the casings using coiled tubing installation or a different insertion procedure. In some embodiments, casings may be inserted using methods other than coiled tubing installation, and elements positioned in the casing may be installed using coiled tubing installation.

Diameters of freeze well casings installed in the ground may be oversized as compared to a minimum diameter needed to allow for formation of a low temperature zone. For example, if design calculations indicate that 10.2 cm piping is needed to provide sufficient heat transfer area between the soil and the freeze wells, 15.2 cm piping may be placed in the soil. The oversized casing may allow a sleeve or other type of seal to be placed into the casing should a leak develop in the freeze well casing.

A time needed to form a low temperature zone may be dependent on a number of factors and variables. Such factors and variables may include, but are not limited to, length of the low temperature zone; freeze well spacing; fluid flow rate into the treatment area; salinity of the fluid flowing into the treatment area; and the refrigeration system type, refrigerant temperature, and refrigerant used to form the barrier. The time needed to form the low temperature zone may range from about two days to more than a year, depending on the extent and spacing of the freeze wells. In some embodiments, a time needed to form a low temperature zone may be about 6 to 8 months.

Spacing between adjacent freeze wells may be a function of a number of different factors. The factors may include, but are not limited to, physical properties of soil material, type of refrigeration system, type of refrigerant, flow rate of material into or out of a treatment area defined by the freeze wells, time for forming the low temperature zone, and economic considerations. Consolidated or partially consolidated soil material may allow for a large separation distance between freeze wells. A separation distance between freeze wells in consolidated or partially consolidated soil material may be from about 3 m to 10 m or larger. In an embodiment, the spacing between adjacent freeze wells is about 5 m. Spacing between freeze wells in unconsolidated or substantially unconsolidated soil material may need to be smaller than spacing in consolidated soil material. A separation distance between freeze wells in unconsolidated material may be 1 m or more.

Numerical simulations may be used to determine spacing for freeze wells based on known physical properties of the soil. Numerical simulation may be utilized to determine an optimum spacing between freeze wells and between freeze wells and heater wells. A general purpose simulator, such as the Steam, Thermal and Advanced Processes Reservoir Simulator (STARS) available from Computer Modeling Group, Ltd. (Alberta, Canada), may be used for numerical simulation work. Also, a simulator for freeze wells, such as TEMP W available from Geoslope (Calgary, Alberta), may be used for numerical simulations. The numerical simulations may include the effect of heat sources operating within a treatment area defined by the freeze wells.

FIG. 1 depicts freeze wells 22 placed in a single row around a treatment area. A substantially regular spacing may separate adjacent freeze wells 24. Spacing between adjacent freeze wells may range from about 0.6 m to 6.1 m or more. The spacing between adjacent freeze wells may depend on a number of factors. Such factors may include, but are not limited to, temperature of the freeze wells, available time to form the freeze wall, economics, composition of the soil, physical properties of the soil, and thickness of the barrier to be formed by the freeze wells. An unconsolidated soil may require a close spacing between adjacent freeze wells. A consolidated soil may allow a larger spacing. In an embodiment, the spacing between adjacent freeze wells is from about 1 m to about 2 m. Larger or smaller spacings may also be used. Typically, spacing for freeze wells is less than spacing for soil remediation wells. In an embodiment of a soil remediation system, the freeze well spacing may be a convenient multiple of the soil remediation well spacing so that some of the freeze wells may be converted to soil remediation wells, if desired. In an embodiment, the freeze well spacing is about ½ of the soil remediation well spacing.

Figure 3:
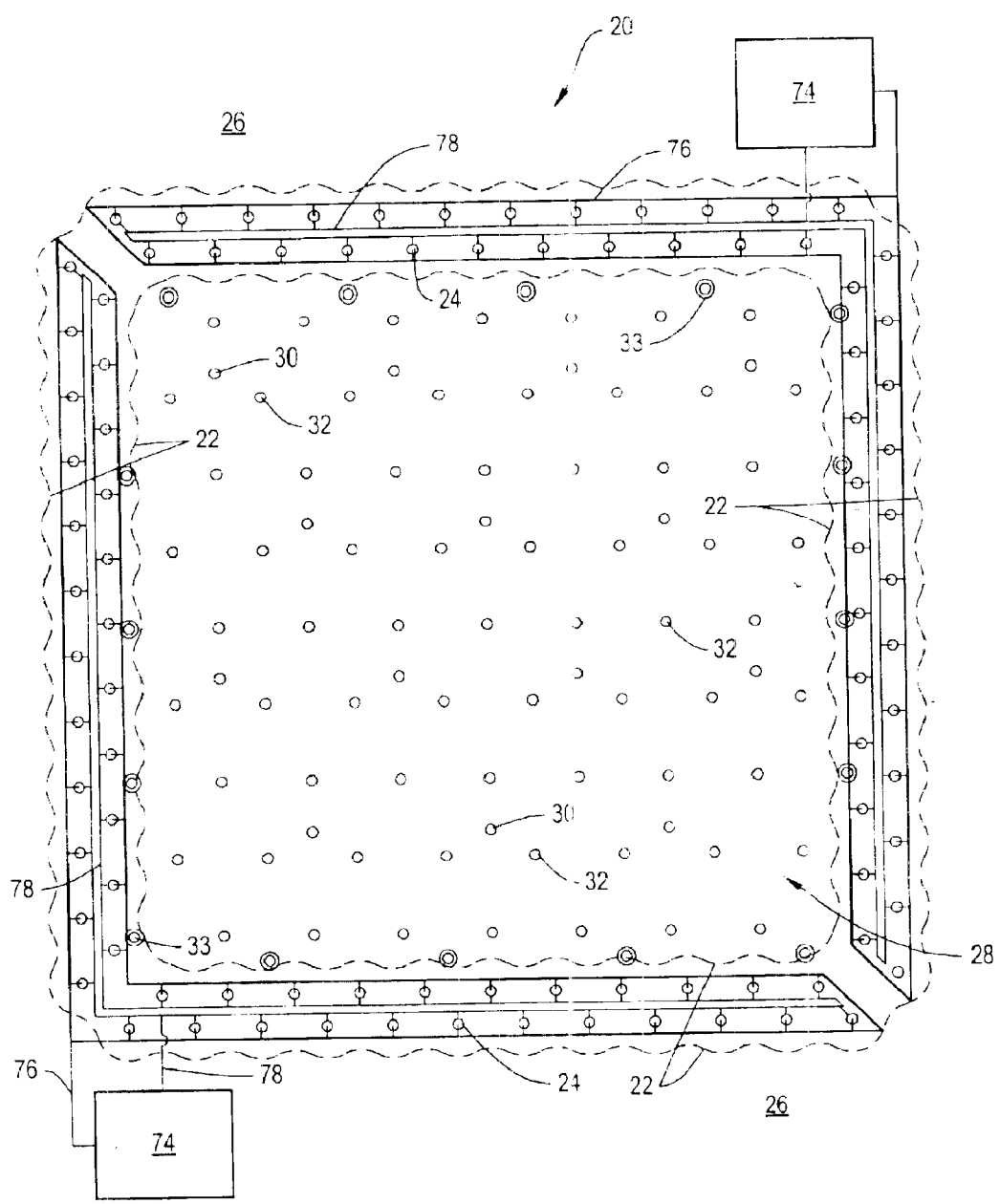
FIG. 3 depicts a top view of a well pattern for a soil remediation system embodiment having a double ring of freeze wells surrounding a treatment area.

FIG. 3 depicts freeze wells 24 placed in two rows around treatment area 28. Three or more rows of freeze wells may also be used. Freeze wells 24 placed in multiple rows around a treatment area may form a thicker barrier than a single row of freeze wells. The rows of freeze wells 24 may be staggered to minimize a separation distance between adjacent freeze wells. In an embodiment, a normal separation distance between wells in a first row and wells in a second row may be ½ a separation distance between adjacent wells in the first row. For example, wells in a first row may be spaced 2.2 m apart, and wells in a second row may be placed between the wells of the first row and about 1.1 m away from the first row. Other separation distances and patterns may also be used. The rows of freeze wells may be staggered so that the freeze wells are substantially in an isosceles triangle pattern.

A refrigeration system for forming a barrier may be a batch system or a circulated fluid system. In some soil remediation system embodiments, water may be added to the soil adjacent to some freeze wells to saturate the soil and ensure the formation of a barrier that will inhibit fluid from flowing into or out of a treatment area. If the freeze wells are placed in wellbores, water may be introduced into the wellbores before the freeze wells are placed in the wellbores. Excess water may be removed from wellbores by a suction pump or suction pumps. In some embodiments, a portion of a freeze well casing adjacent to soil that needs to be wetted may include perforations that allow water to be introduced into the soil. In some embodiments, the perforations may be closed with a liner or a sealant to inhibit fluid from entering the freeze well casing after the soil is wetted. In other embodiments, the perforations may remain open.

Figure 4:
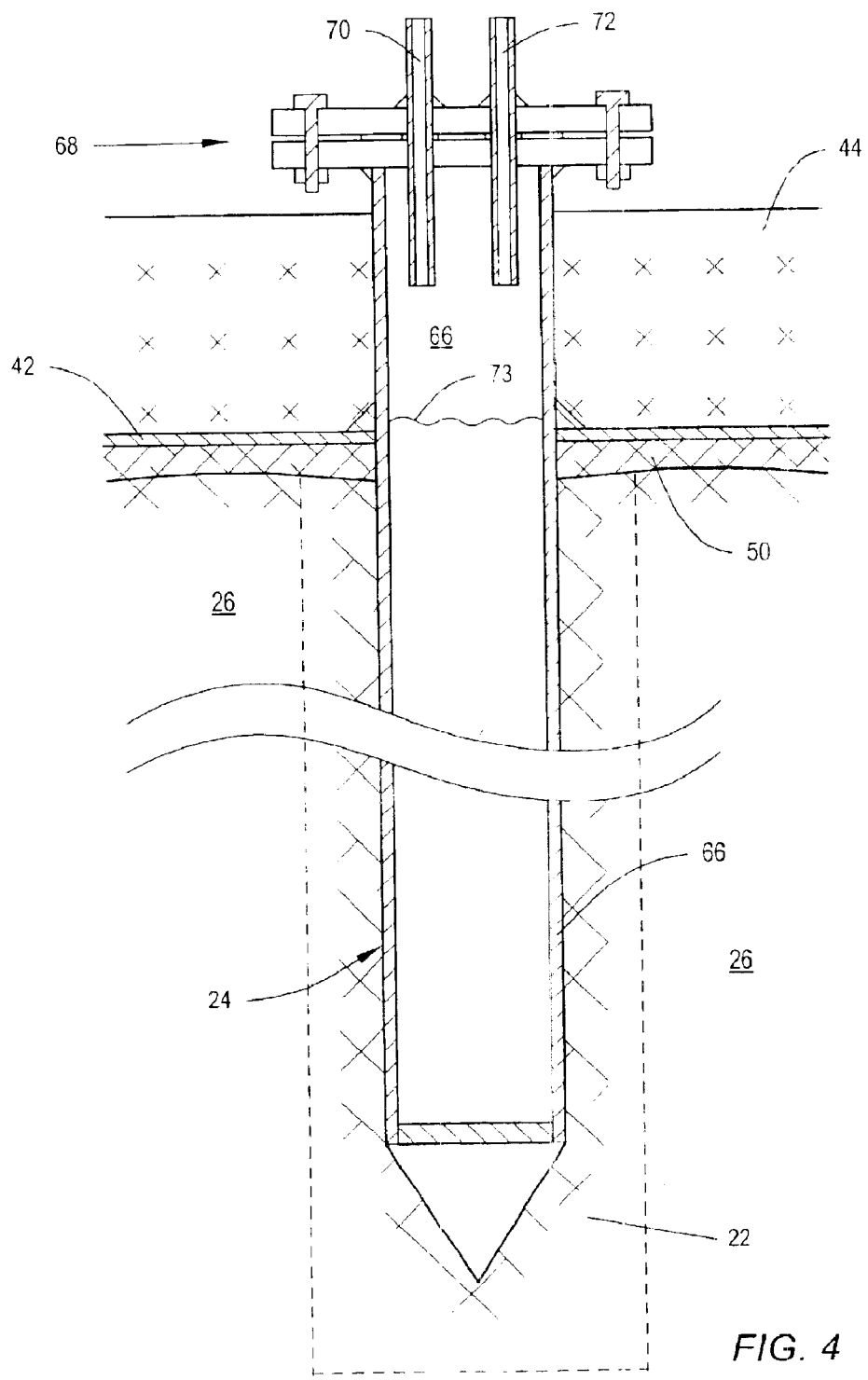
FIG. 4 depicts a cross-sectional representation of an embodiment of a batch operated freeze well.

A soil remediation system may utilize batch operated freeze wells. FIG. 1 depicts an embodiment of a batch operated refrigerant system used to form barrier 22. FIG. 4 depicts an embodiment of freeze well 24 for a batch operated refrigerant system. Freeze well 24 for a batch operated refrigerant system may include casing 66 and casing flange 68. Casing flange 68 may be insulated. Casing flange 68 may include refill line 70 and/or vent line 72. To utilize freeze well 24, the freeze well may be filled with refrigerant 73. The refrigerant may be liquid nitrogen, a dry ice and low freezing point fluid bath, or other cryogenic fluid. The refrigerant may absorb heat from soil 26, resulting in formation of frozen barrier 22. Pressure developed in the freeze well 24 may be vented through vent line 72. Refrigerant may be refilled in freeze well 24 through refill line 70. Alternatively, casing flange 68 may be periodically removed and casing 66 may be refilled with refrigerant. Refrigerant may be brought to a desired temperature on site, or the refrigerant may be shipped to the site by train, freighters, or other vehicles. The refrigerant may be stored on site in tanks or other facilities.

In an embodiment of a soil remediation system, pressurized carbon dioxide or a dry ice slurry may be used as a refrigerant to create a frozen barrier. Liquid nitrogen may be used as a cryogenic refrigerant to create a frozen barrier in another embodiment. The use of liquid nitrogen may favor a close well spacing of 1.2 m or less between wellbores. The time to complete a barrier for wells on 0.9 m centers using liquid nitrogen may be about 80–100 hours. An amount of liquid nitrogen needed to form a barrier may be about 1.9 metric tons of liquid nitrogen per cubic meter of saturated soil. The liquid nitrogen usage rate per unit length of freeze well may be about 0.22 kg per minute per meter of well. The expense of liquid nitrogen may make the use of liquid nitrogen applicable only to small remediation sites. For larger remediation sites, circulated brine or an evaporation cycle refrigeration cycle may be more economically attractive.

A frozen barrier formed by batch operated freeze wells may be formed in open wellbores or in perforated casings. In an embodiment of an open wellbore system, water may be introduced into freeze wells to fill fissures and/or pore space within the soil adjacent to the wellbore. A suction pump may be used to remove excess water from the opening. In other embodiments, the addition of water into the opening may not be necessary. A very cold fluid, such as liquid nitrogen, may be introduced into the opening to freeze soil adjacent to the opening and seal any fissures or permeability of the soil. The very cold fluid may be periodically replenished so that the frozen barrier is formed and maintained. Alternatively, a less cold, less expensive fluid, (such as a dry ice and low freezing point liquid bath) may be substituted for the very cold fluid after evaporation or removal of the very cold fluid from the wellbore. The less cold fluid may be used to form and maintain the frozen barrier.

A soil remediation system may use a circulated refrigerant type of refrigeration system to form barrier 22. FIG. 3 depicts a well pattern for a soil remediation system that will utilize a circulated refrigerant. The refrigeration system may include refrigeration unit or units 74, cold side refrigeration conduits 76, and warm side refrigeration conduits 78. Refrigeration conduits 76, 78 may be insulated pipe. Cold side and warm side refrigeration conduits 76, 78 may be coupled to freeze wells 24 in series, parallel, or series and parallel configurations. The type of piping system used for conduits 76, 78 may depend on the type of refrigeration system, the number of refrigeration units, and the heat load required to be removed by the refrigeration system.

A circulated fluid refrigeration system may utilize a liquid refrigerant that is circulated through freeze wells. A liquid circulation system utilizes heat transfer between a circulated liquid and the soil without a significant portion of the refrigerant undergoing a phase change. The liquid may be any type of heat transfer fluid able to function at cold temperatures. Some of the desired properties for a liquid refrigerant are: low working temperature, low viscosity, high specific heat capacity, high thermal conductivity, low corrosiveness, low toxicity, and low cost. A low working temperature of the refrigerant allows for formation of a large low temperature zone around a freeze well. A low working temperature of the liquid should be about −20° C. or lower. Fluids having low working temperatures at or below −20° C. may include certain salt solutions (e.g., solutions containing calcium chloride or lithium chloride). Other salt solutions may include salts of certain organic acids (e.g., potassium formate, potassium acetate, potassium citrate, ammonium formate, ammonium acetate, ammonium citrate, sodium citrate, sodium formate, sodium acetate). One liquid that may be used as a refrigerant is Freezium®, available from Kemira Chemicals (Helsinki, Finland).

A refrigeration unit may be used to reduce the temperature of a refrigerant liquid to a low working temperature. In some embodiments, the refrigeration unit may utilize an ammonia vaporization cycle. Refrigeration unit 74, depicted in FIG. 3, may be a high volume unit. A temperature difference between fluid at an inlet side and fluid at an outlet side of refrigeration unit 74 may range from about 5° C. to about 30° C. when the unit is activated to begin formation of barrier 22. The temperature difference may reduce to about 1° C. or less during maintenance of formed barrier 22. Refrigeration units are available from Cool Man Inc. (Milwaukee, Wis.), Gartner Refrigeration (Plymouth, Mich.), and other suppliers.

In some embodiments, refrigeration units for chilling refrigerant may utilize an absorption-desorption cycle. An absorption refrigeration unit may produce temperatures down to about −60° C. using thermal energy. Thermal energy sources used in the desorption unit of the absorption refrigeration unit may include, but are not limited to, hot water, steam, fluid, and/or exhaust gas. In some embodiments, ammonia is used as the refrigerant and water as the absorbent in the absorption refrigeration unit. Absorption refrigeration units are available from Stork Thermeq B.V. (Hengelo, The Netherlands).

A liquid circulation system utilizes heat transfer between a circulated liquid and the soil with substantially no phase change in the refrigerant. In a vaporization cycle, heat from the soil vaporizes a liquid. The liquid is condensed in a refrigeration unit and circulated back to the soil. The refrigerant may be, but is not limited to, propane or ammonia.

Figure 5:
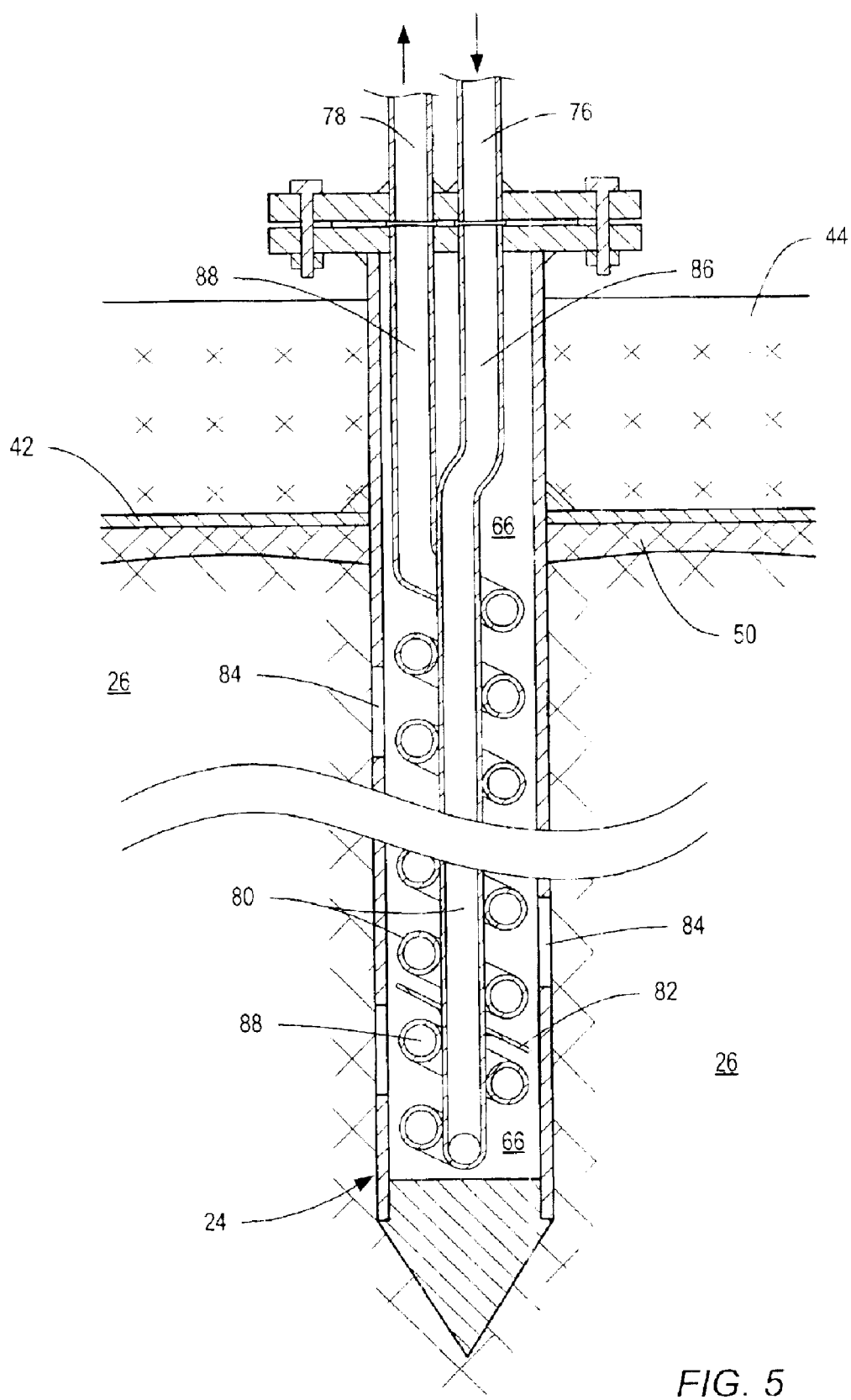
FIG. 5 depicts a cross-sectional representation of a portion of an embodiment of a freeze well for a circulated refrigerant system, in which a conduit is used to transport fluid into and out of a freeze well.
Figure 6:
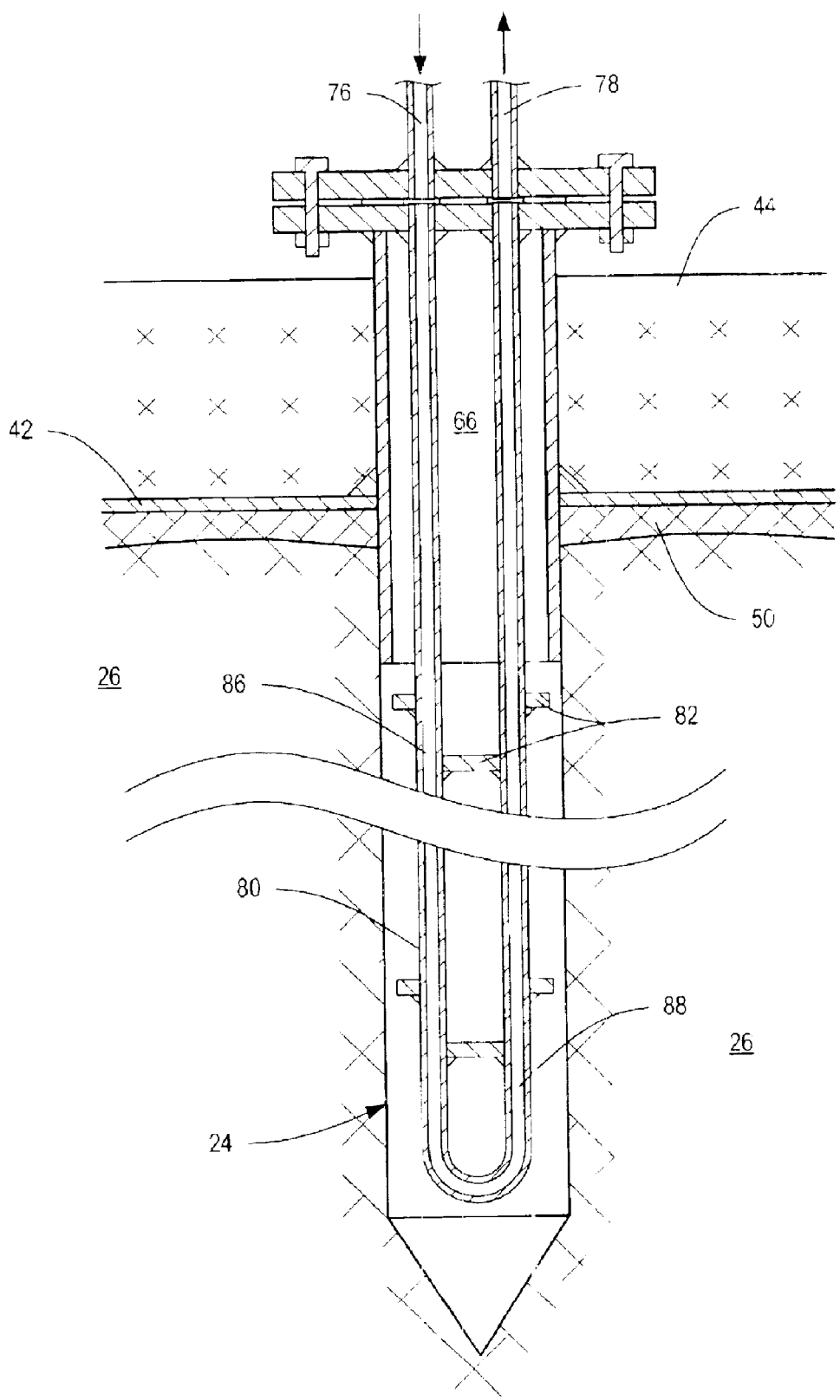
FIG. 6 depicts a cross-sectional representation of a portion of an embodiment of a freeze well that includes a conduit placed within an open wellbore.
Figure 7:
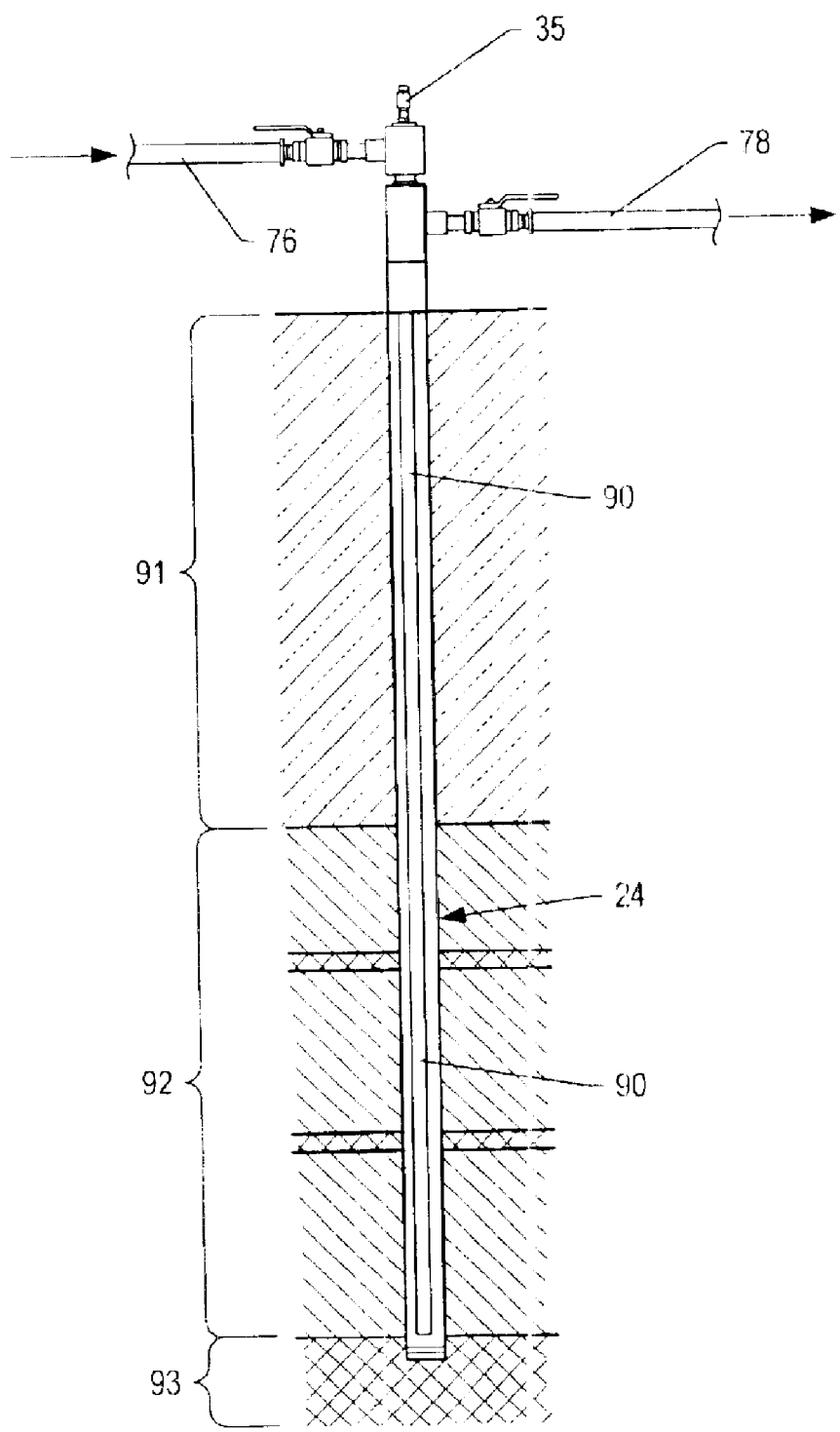
FIG. 7 depicts a representation of an embodiment of a freeze well for a circulated refrigerant system, wherein refrigerant flows into the freeze well through an inlet line and passes through the freeze well in an annular space between the inlet line and a well casing, and wherein the freeze well is shown in a cross-sectional representation below ground surface.

FIG. 5, FIG. 6, and FIG. 7 depict embodiments of freeze wells that may be used in a circulated refrigeration system. FIG. 5 depicts a portion of freeze well 24 having conduit 80, spacers 82, and casing 66. Spacers 82 may keep conduit 80 from contacting casing 66. Conduit 80 may be suspended or packed in casing 66. Suspending conduit 80 may advantageously provide contraction and expansion space for the conduit. Casing 66 may be filled with water, a low freezing point fluid, or other heat transfer fluid to enhance thermal contact and promote heat transfer between soil 26, the casing and conduit 80 in some freeze well embodiments, conduits 80 may be suspended or packed in open wellbores or in perforated casings that include openings 84. Perforated casings and/or open wellbores may be used if water is to be introduced into the soil from a freeze well.

Conduit 80 in freeze well 24 may include inlet leg 86 and outlet leg 88. Refrigerant may enter inlet leg 86 from cold side conduit 76. The refrigerant may pass into outlet leg 88 and out of the conduit to warm side conduit 78. Inlet leg 86 may be made of an insulating material, or the inlet leg may be insulated, to inhibit heat transfer between the inlet leg and outlet leg 88. In a conduit embodiment, inlet leg 86 is made of high density polyethylene (HDPE) tubing. Inlet leg 86 may have a diameter of about 2.5 cm to about 5 cm. Larger or smaller diameter inlet legs may also be used. In a conduit embodiment, outlet leg 88 is coiled around inlet leg 86 so that the outlet leg has a large heat transfer surface area. Outlet leg 88 may be formed of a material with a high heat transfer coefficient so that the outlet leg promotes heat transfer with surroundings. In an embodiment, outlet leg 88 is made of copper tubing, copper alloy, stainless steel, or other metal compatible with the refrigerant.

FIG. 6 depicts an embodiment of freeze well 24 having a "U" shaped conduit 80 that is placed in an open wellbore. Freeze well 24 may include a small section of casing 66 at a top of the well to support conduit 80. Spacers 82 may inhibit the conduit from contacting sides of the wellbore. Spacers 82 may also inhibit inlet leg 86 from contacting outlet leg 88.

FIG. 7 depicts an embodiment of freeze well 24 that may be used in a circulated fluid refrigeration system. Freeze well 24 may include casing 66 and inlet 90. In some embodiments, spacers may be positioned between the inlet and the casing. Inlet 90 may be an insulated conduit, or an insulating conduit, that inhibits heat transfer with fluid in the annular space. In an embodiment, inlet 90 is HDPE tubing. A diameter of inlet 90 may typically be from about 2.5 cm to about 5 cm, though larger or smaller diameter tubing may also be used. Fluid from cold side conduit 76 may be pumped into inlet 90. The fluid may pass through the annular space between inlet 90 and casing 66 to warm side conduit 78. Heat may transfer from soil to the fluid in the annular space. In some embodiments, the wellbore in which the casing is placed may be filled with water before insertion of the casing. When the freeze well is activated, the water will freeze and the ice will promote heat transfer between the soil and the casing.

The embodiment depicted in FIG. 7 shows contaminated soil layer 92 positioned between overburden layer 91 and underburden layer 93. Contamination may have migrated into the layer between the overburden and the underburden. The overburden may be thick enough so that heat applied to the soil has negligible influence at the ground surface. A ground cover may not be necessary.

Figure 8:
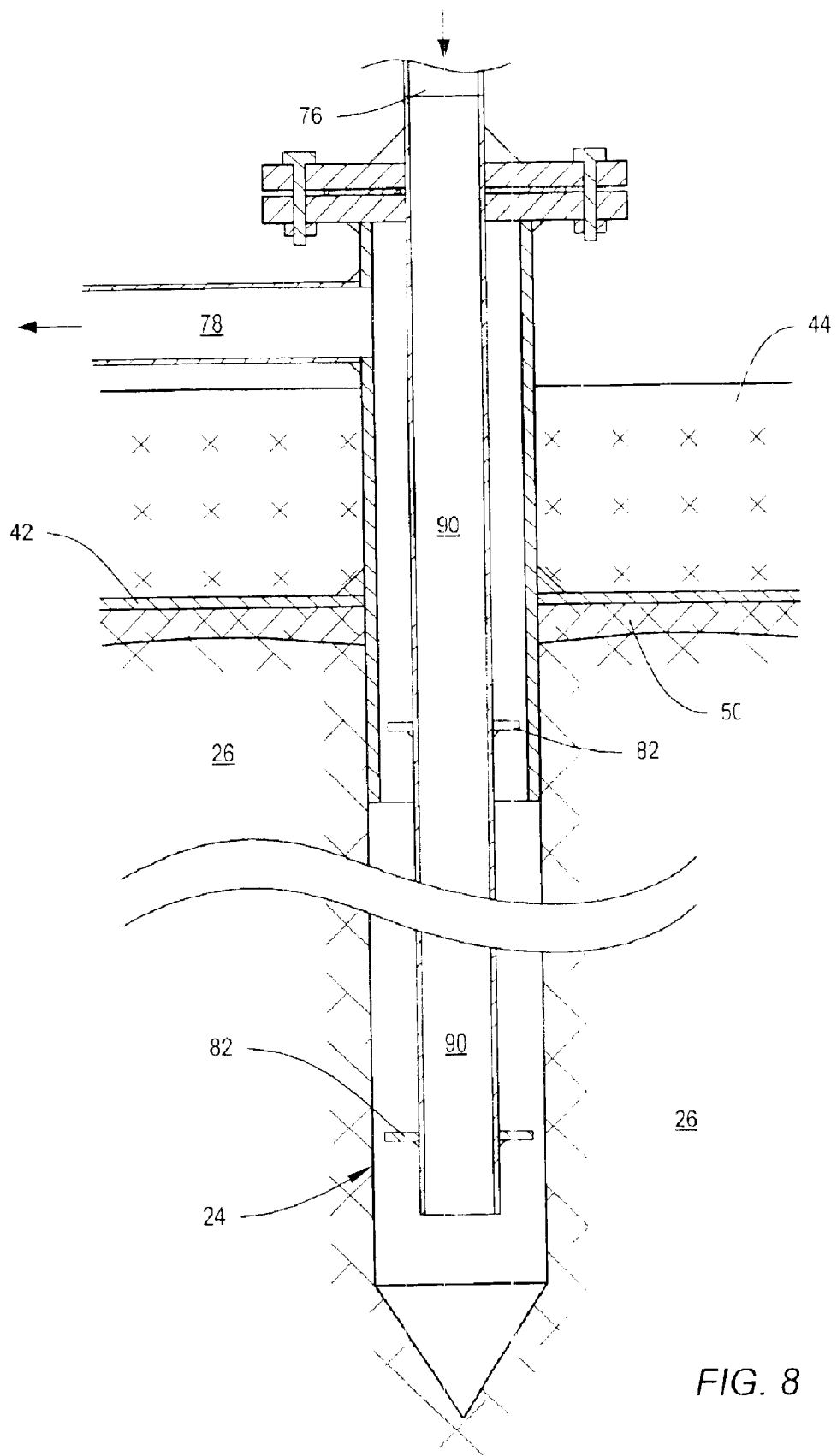
FIG. 8 depicts a cross-sectional representation of an embodiment of a freeze well for a circulated refrigerant system, wherein a portion of the freeze well comprises an open wellbore.

In an embodiment of a freeze well that uses an inlet to introduce a circulated fluid into the freeze well, the freeze well may be formed in an open wellbore. After formation of the wellbore, water may be introduced into the wellbore to fill pore space and fissures adjacent to the wellbore. Excess water may be removed from the wellbore with a suction pump. In some embodiments adding water to the wellbore may not be necessary. A cryogenic fluid, such as liquid nitrogen, may be introduced into the wellbore to form an initial frozen barrier in the wellbore. After evaporation or removal of the cold fluid, a low freezing point fluid may be introduced into the wellbore to transfer heat to the soil so that the temperature of the soil is raised to a temperature above the freezing point of a circulating refrigerant. After the temperature of the soil is raised above the freezing temperature of the refrigerant, the refrigerant may be introduced to the wellbore through an inlet. The fluid may flow upward in an annular space between a wall of the wellbore and the inlet. A separator, such as a screen and filter system, may be used to remove any entrained material within the circulated fluid. FIG. 8 depicts an embodiment of freeze well 24 in which part of a wellbore of the freeze well is an open wellbore through which a refrigerant is circulated. Fluid enters freeze well 24 through inlet 90 and passes out of the freeze well through warm side conduit 78.

A freeze well may be inserted into the soil to a depth that allows a portion of the freeze well to be in an aquitard layer of soil. The aquitard layer may inhibit inflow of water into a treatment area from below. In some soil remediation system embodiments, it may be impractical or undesirable to place portions of freeze wells in an aquitard layer. Forming a bottom freeze barrier may be necessary if there will be a significant amount of upward water migration during remediation, or if there will be a significant amount of contamination migration to deeper soil. A bottom frozen barrier may be formed by placing freeze wells below a treatment area. In an embodiment, wellbores for freeze wells are formed using directional drilling, and freeze wells are formed in the directionally drilled wellbores.

Figure 9:
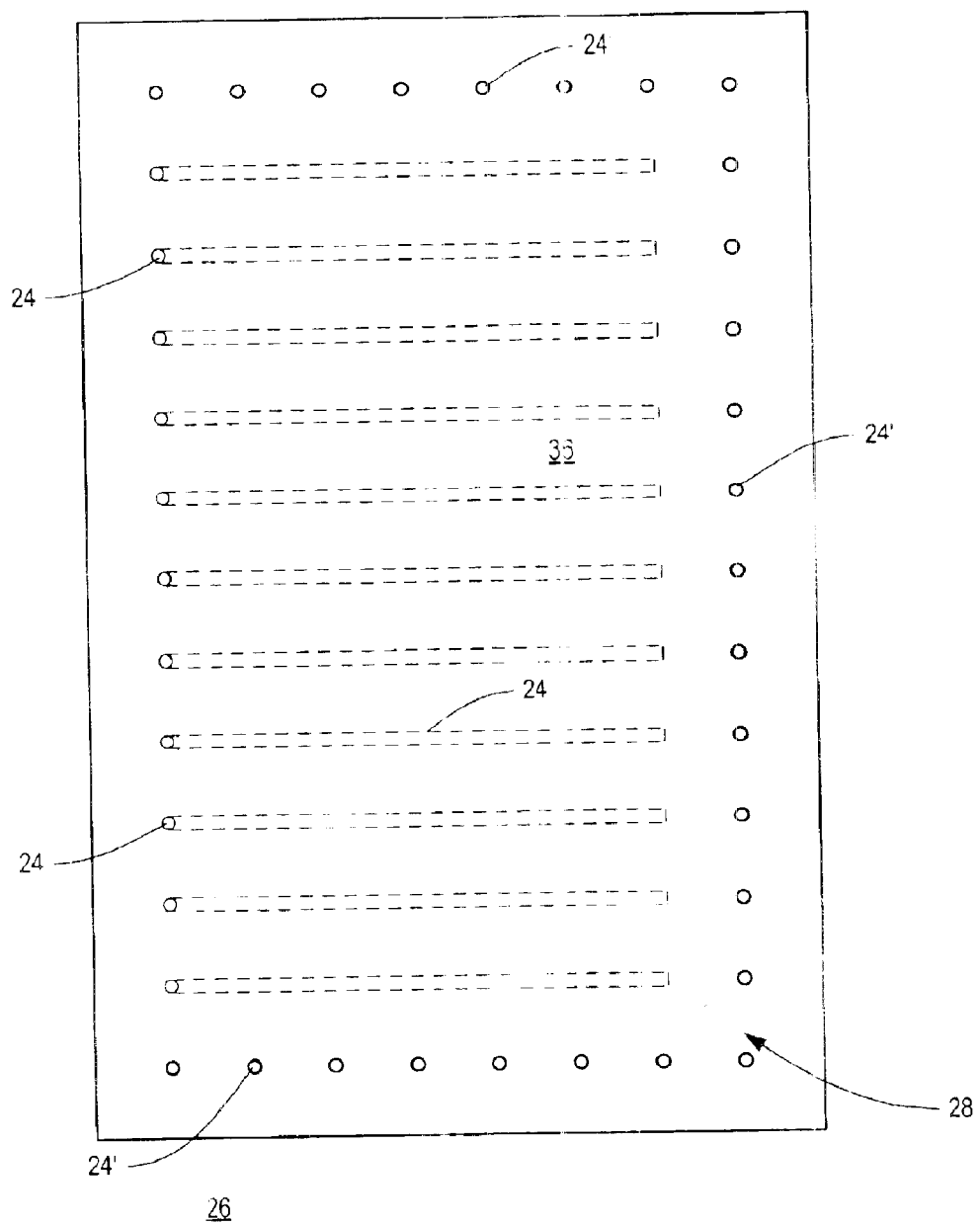
FIG. 9 depicts a plan view representation of freeze well placement, wherein some of the freeze wells are directionally drilled so that a bottom barrier may be formed when the freeze wells are activated.

FIG. 9 depicts a plan view representation of freeze wells that define a treatment area. Freeze wells 24 along a side of the treatment area are directionally drilled to extend across a substantial portion of treatment area 28 so that the freeze wells will form a bottom barrier when activated. Other freeze wells 24' of the pattern are inserted substantially vertically in the ground. When all freeze wells 24, 24' are activated, the freeze wells may isolate a volume of soil so that the soil may be remediated. Freeze wells that will form a bottom frozen barrier may be placed in trenches that extend across a treatment area. In some cases, it may be advantageous to form a freeze barrier above a contaminated zone.

Figure 10:
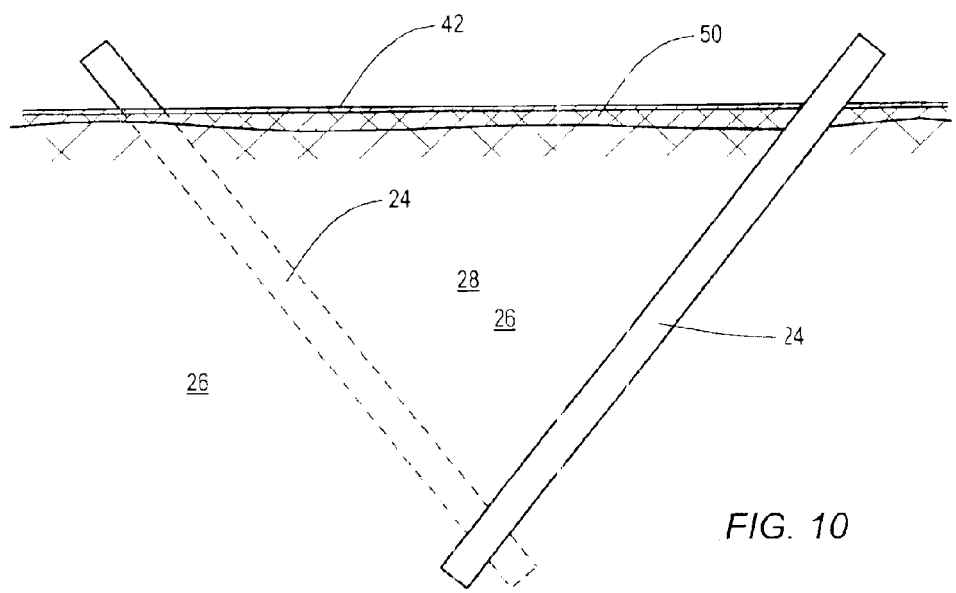
FIG. 10 depicts a representation of freeze well embodiments that are angled into the soil to form a "V" shaped treatment area.
Figure 11:
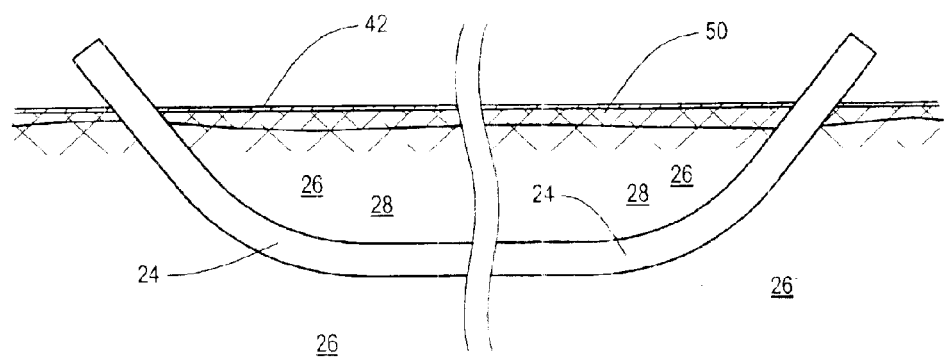
FIG. 11 depicts an embodiment of a "U" shaped freeze well that enters the soil on a first side of a treatment area and exits the soil on a second side of the treatment area.

FIG. 10 depicts a representation of two freeze wells 24 angled into soil 26 so that treatment area 28 between the freeze wells is a "V" shaped area. Rows of freeze wells on opposite sides of treatment area 28 are angled into the soil to define a "V" shaped treatment area. Vertically installed freeze wells may be placed on other sides of treatment area 28 to define a volume of soil to be remediated. FIG. 11 depicts a representation of "U" shaped freeze well 24. The freeze well may be directionally drilled to enter soil 26 on a first side of treatment area 28, extend across the treatment area, and exit the soil on an opposite side of the treatment area. Vertically installed freeze wells may be placed on other sides of treatment area 28 to define a volume of soil to be remediated.

Figure 12:
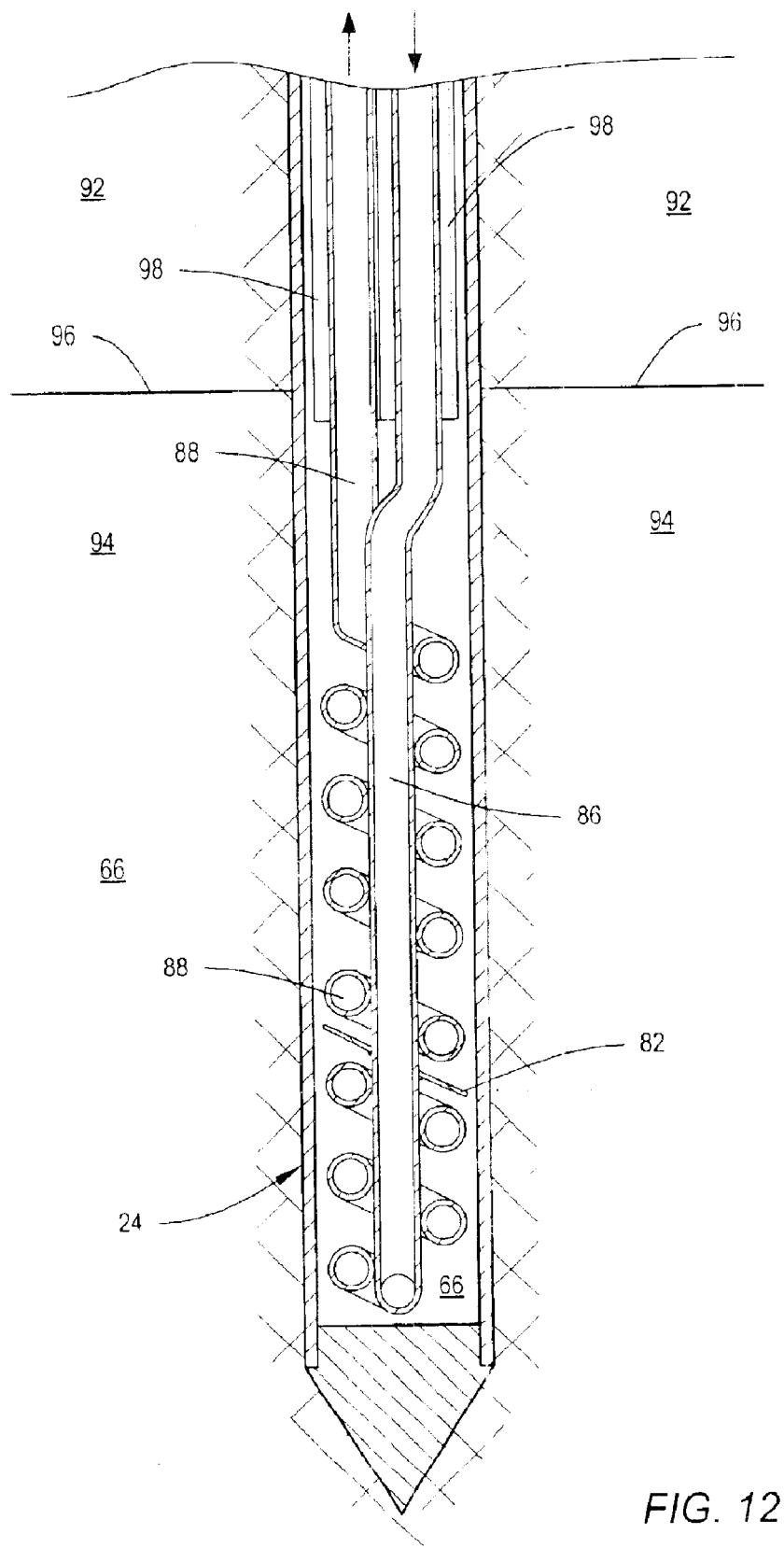
FIG. 12 depicts an embodiment of a freeze well used to form a frozen barrier below soil that is to be thermally remediated.

FIG. 12 depicts a freeze well-soil remediation well combination that may be used to form a freeze well below contaminated soil. Wellbores for perimeter freeze wells and for soil remediation wells may be formed in a treatment area. The wellbores for the soil remediation wells may be drilled through contaminated soil layer 92 and into uncontaminated soil layer 94. Interface 96 may separate the two soil layers 92, 94. If soil layer 94 does not include sufficient water to allow for formation of a bottom frozen barrier, water may be introduced into the layer. A frozen barrier may be formed in uncontaminated soil layer 94. In an embodiment, freeze well conduits may be suspended in the soil in each of the soil remediation well wellbores. Inlet leg 86 of the conduit may include insulation 98, and a portion of outlet leg 88 that is positioned adjacent to contaminated soil 92 may also include insulation. Outlet leg 88 may not have insulation adjacent to the soil layer that the freeze barrier is to be formed in.

Freeze wells that form a bottom layer freeze wall and a perimeter freeze wall may be initialized before soil remediation begins. The bottom barrier may be formed several months in advance of initiation of soil remediation. In an embodiment, the freeze well conduits in the soil remediation wellbores are pulled from the soil remediation wellbores after formation of a bottom barrier, and the wellbores are converted to heater wells, extraction wells, and/or heater-extraction wells. In an embodiment, freeze well conduits and heater elements are placed in the soil remediation wellbores. For example, heater elements may be mineral insulated cables that are tied to and supported on insulated legs of refrigeration conduits. The freeze well conduits remain in the wellbores after formation of the frozen barrier and initiation of soil remediation. Refrigerant may be supplied to the freeze well during soil remediation, or the supply of refrigerant to the freeze well portions may be stopped during soil remediation. In an embodiment, a bottom frozen barrier may be formed using a batch system for forming the bottom frozen barrier. For example, liquid nitrogen may be placed in bottom sections of casings of soil remediation wells that are adjacent to a permeable layer of soil in which the bottom frozen barrier is to be formed. The liquid nitrogen may be replenished as necessary.

Freeze wells that form a frozen barrier may be placed in uncontaminated soil, or substantially uncontaminated soil, so that the frozen barrier formed by the freeze wells does not contain significant amounts of contamination. In some soil remediation system embodiments, freeze wells may be formed with heater elements, such as mineral insulated cables. In other soil remediation system embodiments, refrigeration elements may be removed from a wellbore and heater elements may be installed in wellbores of freeze wells. After completion of remediation of soil on an inward side of the freeze wells and utilization of thermal energy of the freeze wells and barrier, the heater elements may be activated to heat the previously frozen soil. Vapor within the soil may preferentially flow toward extraction wells of the soil remediation system due to increased permeability of the treated soil. Also, some or all of the freeze wells converted to heater wells may be perforated and coupled to a vacuum system so that the converted freeze wells are heater-extraction wells. Some freeze wells may be converted to extraction wells by coupling the wells to the vacuum system. Such wells may not include heater elements.

Figure 13:
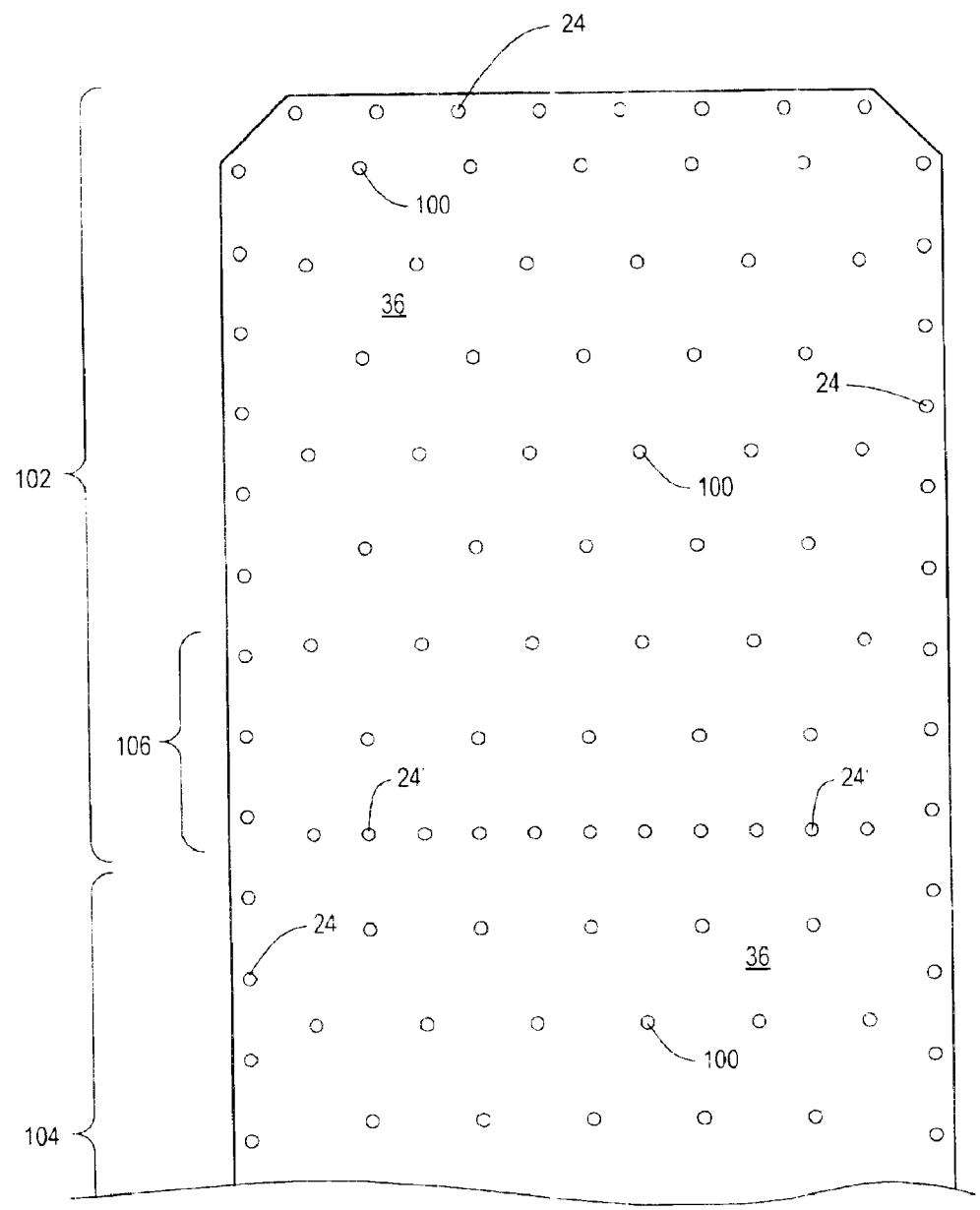
FIG. 13 depicts an embodiment of a remediation system that may be used to treat a long strip of contaminated soil.

A large area of soil contamination may be treated in sections. FIG. 13 depicts a plan view representation of freeze wells 24 and soil remediation wells 100 that may be used to treat a long strip of contaminated soil. Freeze wells 24 may be formed along a first end and sides of a portion of the length of the contaminated soil strip to define first zone 102. Freeze wells 24 may be placed in uncontaminated soil, or substantially uncontaminated soil, that is adjacent to the contaminated soil. Soil remediation wells 100 may be inserted into first zone 102. Patterns of freeze wells 24 and soil remediation wells 100 may be extended into second zone 104 that abuts first zone 102. Soil remediation wells 100 may be coupled to a treatment facility. Ground cover 36 may be installed over the zone 102. The ground cover may also extend over second zone 104.

In an embodiment, freeze wells 24' may be placed between first zone 102 and second zone 104 so that the freeze wells form a frozen separation barrier between the first zone and the second zone. Spacing between soil remediation wells 100 and spacing between freeze wells 24' that form the separation barrier may be, or may be adjusted to be, convenient multiples so that some or all of the freeze wells that form the separation barrier may be converted to soil remediation wells that fit within a pattern of soil remediation wells. Wellbores for freeze wells 24' that form separation barriers may be formed in the soil at selected intervals along the length of the contaminated soil to define treatment zones that will result in the remediation of the entire length of contaminated soil.

In an alternative embodiment, a metal sheet barrier may be inserted, or a grout wall may be formed, in the soil between a first zone and a second zone. The barrier may advantageously inhibit or substantially inhibit fluid transport between the first and second zones, while allowing all of the soil up to the barrier to be remediated. A portion of heat applied in the first zone near the barrier may transfer across the barrier into the second zone. Metal barriers may be inserted, or grout walls may be formed, at selected intervals along the length of the contaminated soil to define treatment zones that will result in the remediation of the entire length of contaminated soil.

Freeze wells 24 in first zone 102 may be activated to form a frozen barrier around the first zone. Soil within first zone 102 may be remediated using soil remediation wells 100 after formation of the frozen barrier. When remediation of first zone 102 nears completion, freeze wells of second zone 104 may be activated to extend a frozen barrier along a length of the contaminated soil. After completing remediation of the first zone, some of the freeze wells, including freeze wells 24' that form the separation barrier, may be deactivated. Some of freeze wells 24 and some of soil remediation wells 100 in section 106 of first zone 102 may remain activated. After formation of the extended frozen barrier, soil remediation wells 100 in second treatment zone 104 may be activated. If the separating barrier between first zone 102 and second zone 104 is a frozen barrier, activated soil remediation wells of the first zone and the soil remediation wells of the second zone may destroy the separating frozen barrier. Some or all of freeze wells 24' that formed the separating barrier may be converted to soil remediation wells after deactivating the freeze wells. Activated soil remediation wells 100 and freeze wells 24 in section 106 may inhibit migration of fluid beyond the activated wells. Additional zones may be treated by extending the pattern of wells along the length of the contaminated soil until all of the contaminated soil is treated.

A treatment area for soil remediation may be determined using monitoring wells or other techniques. Samples of the soil may be taken and analyzed. Hydrology of the soil may be determined. Simulations of a soil remediation system for removing or reducing contamination within the treatment area may be run to determine freeze well spacings and soil remediation well spacings to remediate the soil within a desired time frame.

Freeze wells, soil remediation wells, and/or test wells may be installed in the ground. If a frozen barrier is to be formed using a circulated refrigerant, the freeze wells may be coupled to a refrigeration unit or refrigeration units. Soil remediation wells, test wells and refrigeration units may be coupled to electrical systems and a control system. A vapor collection system may be installed to transport off-gas to a treatment facility. Portions of the vapor collection system may be heat traced and coupled to a power supply system. A ground cover may be formed over the treatment area. If necessary, water may be introduced into the soil adjacent to the freeze wells to saturate the soil. Freeze wells may be initiated to form the frozen barrier around the treatment area. Formation of the barrier may seal the ground cover to the ground.

Figure 14:
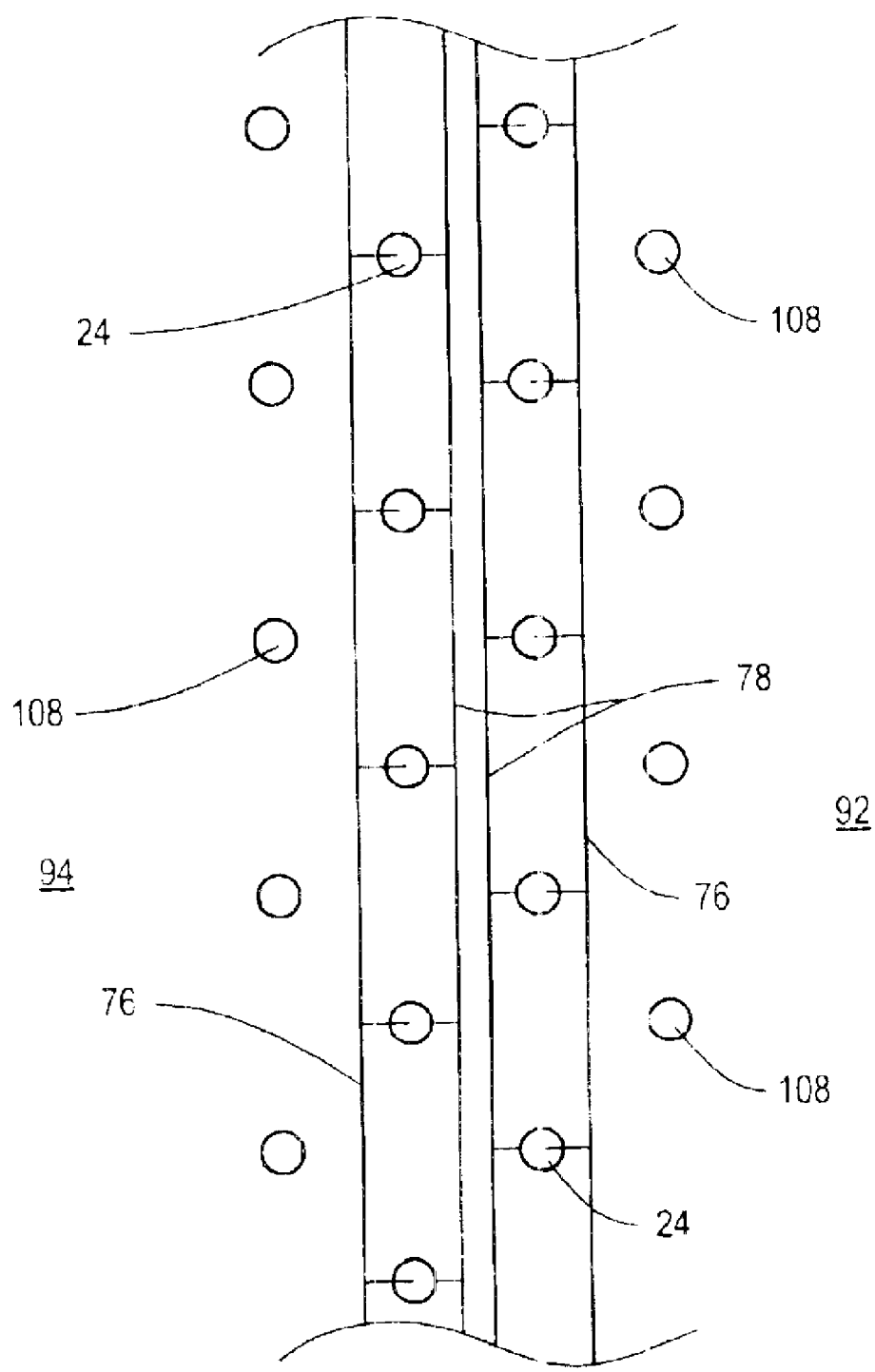
FIG. 14 depicts an embodiment of freeze wells and wells that allow formation of a frozen barrier between the freeze wells even though fluid flows between the freeze wells.

In some embodiments, suction wells and/or injection wells may be used to allow for formation of a frozen barrier. As depicted in FIG. 14, wells 108 may be formed to a side or sides of freeze wells 24. Wells 108 may be used to inhibit water flow between freeze wells so that the freeze wells may form a frozen barrier (e.g., dewatering wells). Operation of wells 108 may be discontinued after formation of a frozen barrier of sufficient thickness to resist the flow of water.

In an embodiment, wells 108 may be placed sufficiently close to the freeze wells so that the frozen barrier formed by the freeze wells encompasses the wells. In some embodiments, wells 108 may be used as test wells or soil remediation wells after formation of the frozen barrier. If wells 108 remove water from the soil, the water may be treated in a treatment facility to remove or reduce contamination within the water. In an embodiment, wells 108 may be placed on an inward and an outward side of where a frozen barrier is to be formed and through which water flows. Suction pumps coupled to wells 108 may be operated to minimize a pressure differential between inward suction wells and outward suction wells so that fluid flow between the inward and outward suction wells is reduced or stopped. Wells 108 may dewater the region adjacent to freeze wells 24. Freeze wells 24 may form a low temperature zone that is sufficient to freeze water in the soil if the soil is dewatered by wells 108. After the low temperature zone is formed, power supplied to wells 108 may be reduced to allow water to enter into the low temperature zone and freeze. After formation of a frozen barrier, wells 108 may be deactivated.

Freeze wells may be initiated before initiation of heater wells within a treatment area. The time needed to form a frozen barrier may be dependent on a number of factors and variables. Such factors and variables may include, but are not limited to, length of the frozen barrier, freeze well spacing, fluid flow rate into the treatment area, salinity of the fluid within the treatment area, refrigeration system type, and refrigerant used to form the barrier. The time needed to form the frozen barrier may range from about 2 days to 4 months or more.

In some embodiments, a tracer test may be used to determine or confirm formation of a frozen barrier. A tracer fluid may be injected on a first side of a perimeter barrier. Monitor wells on a second side of the perimeter barrier may be operated to detect the tracer fluid. No detection of the tracer fluid by the monitor wells may indicate that the perimeter barrier is formed. The tracer fluid may be, but is not limited to, carbon dioxide, argon, nitrogen, isotope labeled water, or combinations thereof. A gas tracer test may have limited use in saturated soil because the tracer fluid may not be able to travel easily from an injection well to a monitor well through saturated soil. In water saturated soil, an isotope labeled water (e.g., $D_2O$ or tritiated water) or an aqueous solution of a selected ion (e.g., thiocyanate ion) may be used.

In an embodiment, water in the treatment area may be pumped from the treatment area after formation of the barrier and before, or simultaneously with, initiation of heaters. The pumped water may be treated by the treatment facility. In alternative embodiments, heater wells are initiated and water within the soil is vaporized as soil temperatures increase. The soil may be remediated by operation of soil remediation wells. The system may be shut down after remediation. The frozen barrier may be utilized to form another frozen barrier. A heat transfer fluid may be circulated through the freeze wells to cool the heat transfer fluid so that the fluid may be used to remove heat from soil in which the next frozen barrier is to be formed. In some soil remediation embodiments, heat from adjacent soil may be allowed to raise a temperature of the frozen soil to an equilibrium temperature.

A drive fluid may be used in conjunction with a soil remediation system that utilizes freeze wells. The drive fluid may be used to move contaminants within the soil toward extraction wells. Some extraction wells may be converted to injection wells to allow a drive fluid to be injected into the soil. Extraction wells that are to be converted to injection wells may be detached from a vacuum system and attached to an injection system. A ring of extraction wells may be converted to injection wells. After the drive fluid is injected into the soil through the wells, the injection wells may be converted back to extraction wells by reattaching the wells to the vacuum system. A drive fluid may be utilized near an end of a soil remediation process to sweep residual contamination toward extraction wells so that the contamination may be removed from the soil. Increased permeability within the soil due to heating the soil may facilitate removal of residual contamination using a drive fluid.

In an embodiment of a soil remediation system, extraction wells in an outermost ring of extraction wells are converted to injection wells and a drive fluid is introduced into the soil. After sufficient drive fluid is produced from an inner ring of extraction wells, injection of drive fluid may be stopped. The injection wells may be converted back to extraction wells, and the next inner ring of extraction wells may be converted to injection wells. Drive fluid may be injected into the soil until the drive fluid is produced from adjacent extraction wells. The pattern of converting rings of wells and injecting drive fluid may be continued until drive fluid is injected in a ring of extraction wells that surround an innermost ring of injection wells, or innermost injection well. In an alternative embodiment, the pattern may start at the innermost extraction well, or ring of extraction wells, and move outward toward a frozen barrier surrounding a treatment area.

Figure 15:
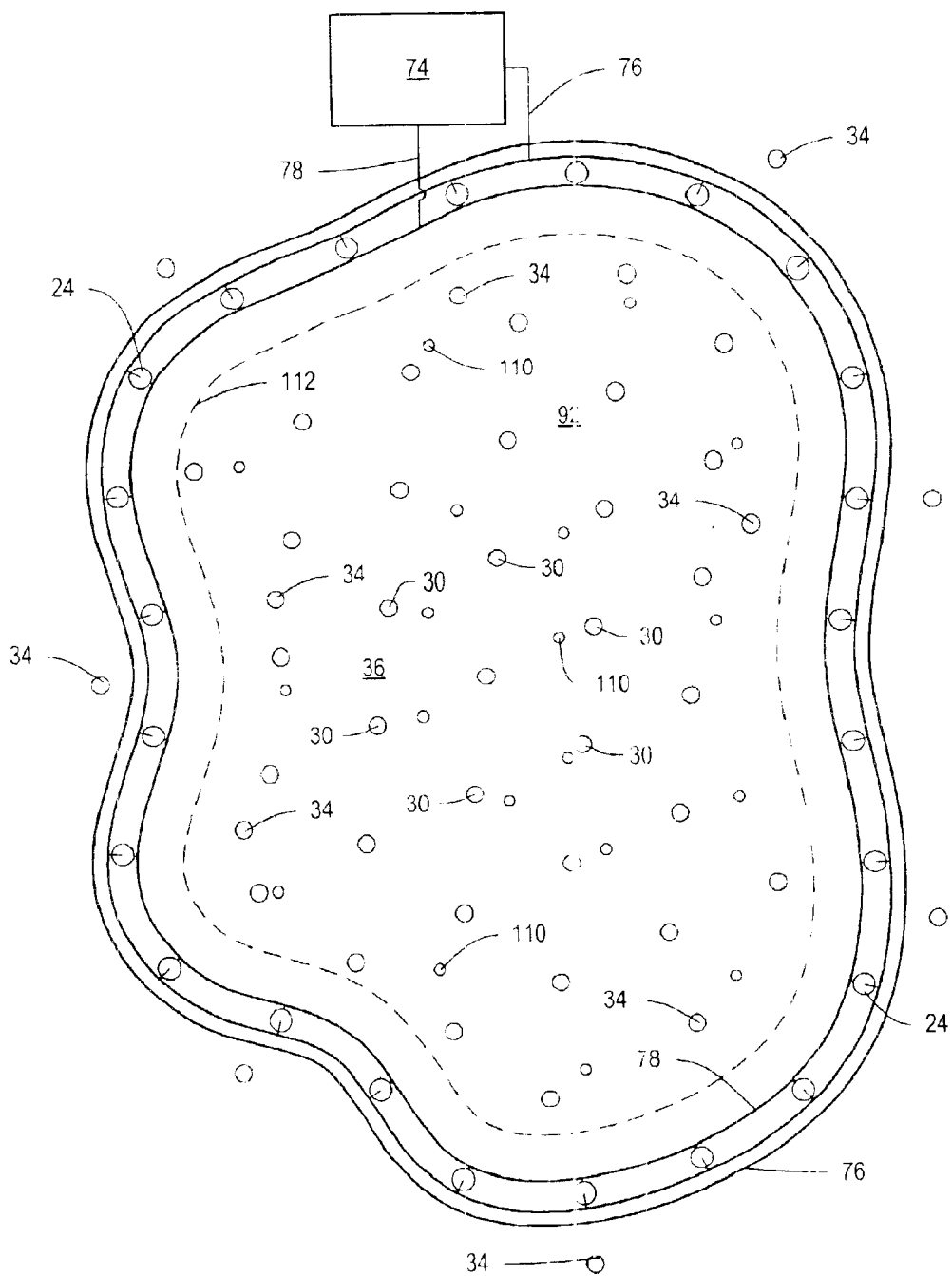
FIG. 15 depicts an embodiment of freeze wells, extraction wells, and electrodes that may be used to remediate contaminated soil using an in situ thermal desorption process that heats the soil by soil resistivity heating.

In an embodiment of an ISTD soil remediation system, the soil may be heated using electrical resistivity heating. A frozen barrier formed by freeze wells may surround the contaminated soil. Typical electrical resistivity heating systems employ 6-phase 60 hertz (Hz) heating or 3-phase 60 Hz heating. Radio frequency heating may also be utilized. Electrode placement in the soil may substantially follow a contour of contamination within the soil. A frozen barrier may confine soil heating to a treatment area. Frozen soil may have an electrical resistivity that is several orders of magnitude greater than the resistivity of unfrozen soil. The greater resistivity of frozen soil may substantially confine current applied to the soil from electrodes within the frozen barrier. The frozen barrier may prevent fringe electric currents from depositing heat outside of a treatment area. FIG. 15 depicts a pattern of freeze wells 24, electrodes 110, and extraction wells 30 that may be used with a soil remediation system that heats soil by soil resistivity heating. Freeze wells 24 are placed around a perimeter of contaminated soil 92. The contaminated soil is confined within the area defined by boundary 112. Freeze wells 24 may be coupled to coolant lines 76, 78 and refrigeration unit 74. Electrodes 110 are inserted into the soil. When current is applied to the electrodes, the soil is heated. Off-gas produced in the soil may be removed from the soil through extraction wells.

Thermal diffusivities and other properties of both saturated, frozen soil material and dry, hot soil material may allow operation of heat sources close to freeze wells. These properties may prevent the heat provided by the heat sources from breaking through a frozen barrier established by the freeze wells. Frozen, saturated soil material may have a significantly higher thermal diffusivity than hot, dry soil material. The difference in the thermal diffusivity of hot, dry soil material and cold, saturated soil material indicates that a cold zone will propagate faster than a hot zone. Fast propagation of a cold zone established and maintained by freeze wells may inhibit a hot zone formed by heat sources from melting through the cold zone during thermal treatment of a treatment area.

Figure 16:
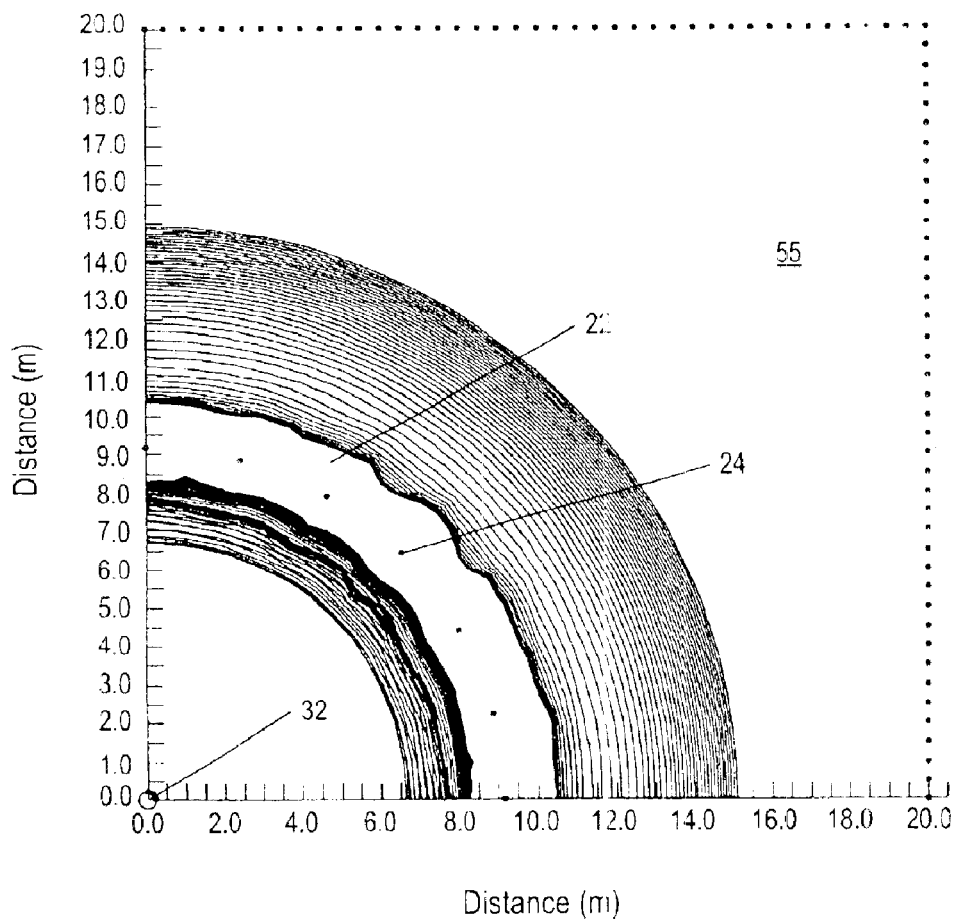
FIG. 16 depicts thermal simulation results of a heat source surrounded by a ring of freeze wells.

In some embodiments, remediation wells may be placed in a relatively close proximity to freeze wells. During soil remediation, a hot zone established by heat sources and a cold zone established by freeze wells may reach an equilibrium condition such that the hot zone and the cold zone do not expand toward each other. FIG. 16 depicts thermal simulation results for an established frozen barrier that has been heated for 1000 days. The freeze wells are operated at −25° C. and the heat source is operated at 650° C. Heater well 32 is located at a center of a ring of freeze wells 24. Freeze wells 24 are about 9.1 m away from the heater well and spaced at about 2.4 m intervals. Arcuate isotherms represent the distribution of heat between heater well 32 at the center of the pattern, freeze wells 24, and exterior region 55 (at an initial soil temperature) beyond the outermost arc. As shown by the isotherms, freeze wells 24 are able to maintain frozen barrier 22 that extends over 1 m inward toward heater well 32. On an outer side of freeze wells 24, barrier 22 is much thicker, and the freeze wells influence soil up to about 15 m away from the freeze wells. After 1000 days, an annular band of frozen soil still exists from 8 m to 12 m. The white region shows the minimum freeze wall thickness during the heating period. Heater wells 32 may be placed closer to freeze wells 24 than the 9.1 m spacing shown in FIG. 16. Heater wells 32 may be operated about 0.3 m from frozen barrier 22 formed by freeze wells 24 without the heater wells being able to break through the frozen barrier in the time needed to remediate soil within the frozen barrier.

Figure 17:
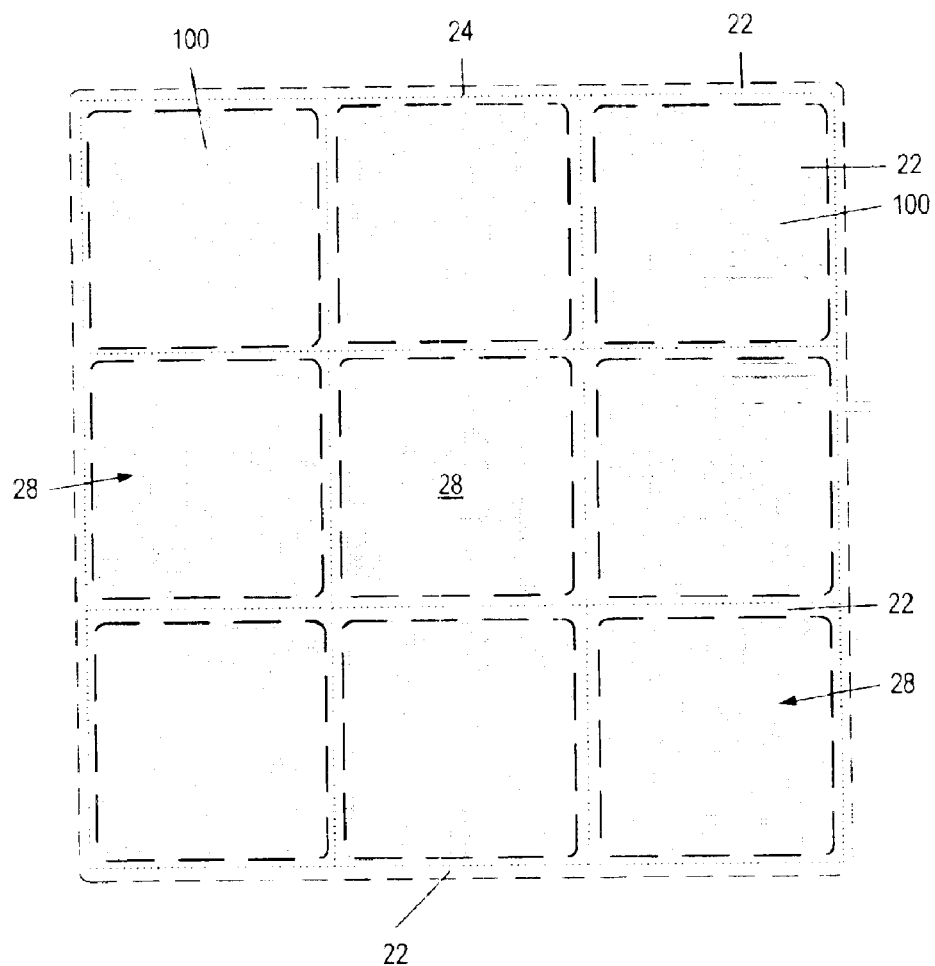
FIG. 17 depicts a plan view representation of rectangular treatment areas.

Soil that is to be treated using a soil remediation process may be separated into several treatment areas by perimeter barriers. FIG. 17 depicts a plan view representation of an embodiment of rectangular perimeter barriers 22 that divide a region into treatment areas. A perimeter barrier for a treatment area 28 may be formed when needed. The complete pattern of perimeter barriers for all of the soil to be subjected to in situ conversion does not need to be formed prior to treating individual treatment areas.

Figure 18:
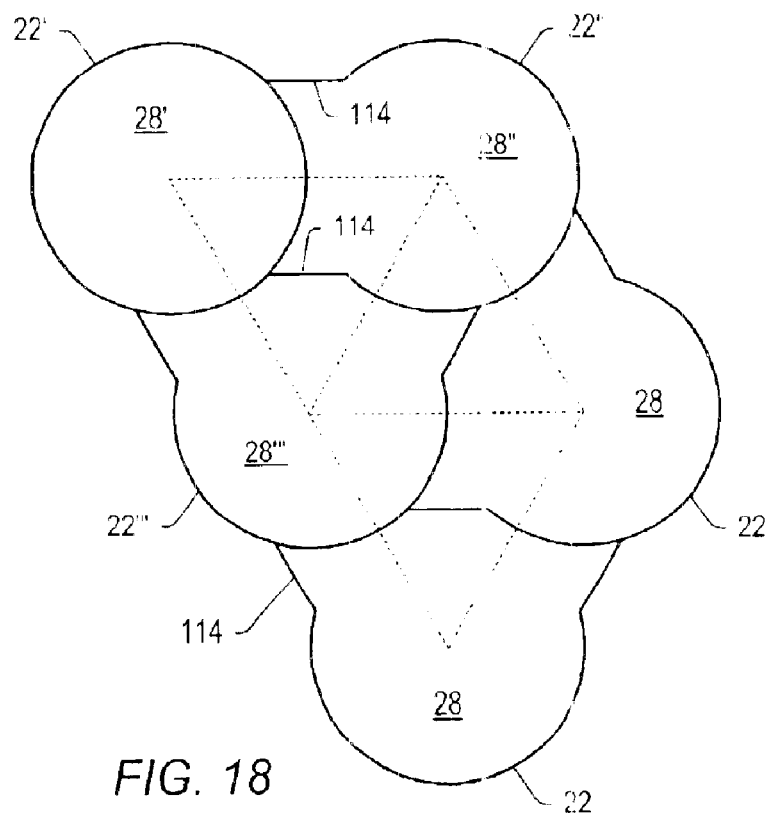
FIG. 18 depicts a plan view representation of an embodiment of treatment areas formed by perimeter barriers having arced portions, wherein the centers of the arced portions are in an equilateral triangle pattern.
Figure 19:
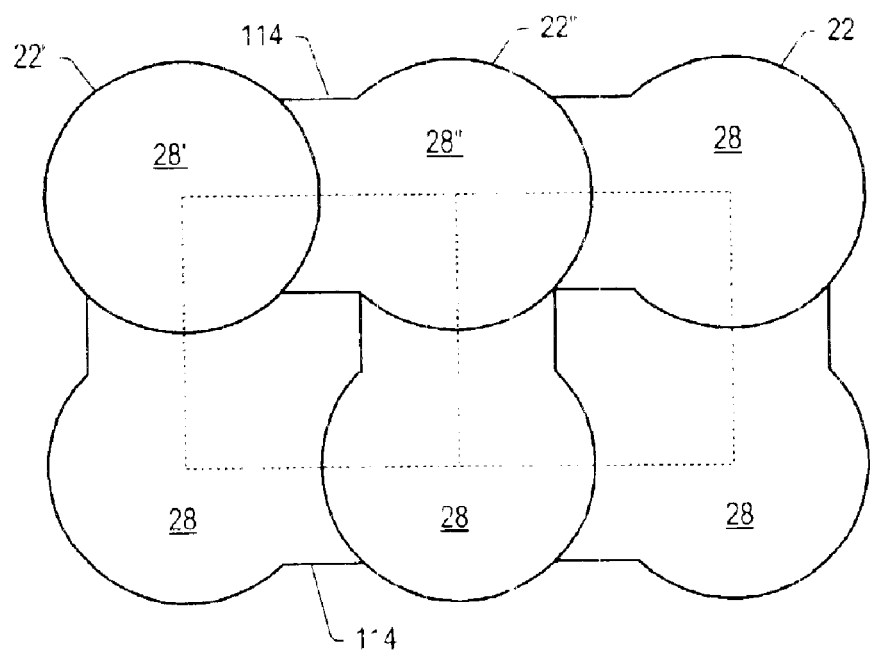
FIG. 19 depicts a plan view representation of an embodiment of treatment areas formed by perimeter barriers having arced portions, wherein the centers of the arced portions are in a square pattern.

Perimeter barriers 22 having circular or arced portions may be placed in the ground in a regular pattern. Centers of the circular or arced portions may be positioned at apices of imaginary polygon patterns. For example, FIG. 18 depicts a pattern of perimeter barriers wherein a unit of the pattern is based on an equilateral triangle. FIG. 19 depicts a pattern of perimeter barriers in which a unit of the pattern is based on a square. Perimeter barrier patterns may also be based on higher order polygons.

FIG. 18 depicts a plan view representation of a perimeter barrier embodiment that forms treatment areas 28 in the ground. Centers of arced portions of perimeter barriers 22 are positioned at apices of imaginary equilateral triangles. The imaginary equilateral triangles are depicted as dashed lines. First circular barrier 22' may be formed in the ground to define first treatment area 28'.

Second barrier 22" may be formed. Second barrier 22" and portions of first barrier 22' may define second treatment area 28". Second barrier 22" may have an arced portion with a radius that is substantially equal to the radius of first circular barrier 22'. The center of second barrier 22" may be located such that if the second barrier were formed as a complete circle, the second barrier would contact the first barrier at a tangent point. Second barrier 22" may include linear sections 114 that allow for a larger area to be enclosed for the same or a lesser length of perimeter barrier than would be needed to complete the second barrier as a circle. In some embodiments, second barrier 22" may not include linear sections and the second barrier may contact the first barrier at a tangent point or at a tangent region. Second treatment area 28" may be defined by portions of first circular barrier 22' and second barrier 22". The area of second treatment area 28" may be larger than the area of first treatment area 28'.

Third barrier 22''' may be formed adjacent to first barrier 22' and second barrier 22". Third barrier 22''' may be connected to first barrier 22' and second barrier 22" to define third treatment area 28'''. Additional barriers may be formed to form additional treatment areas.

FIG. 19 depicts a plan view representation of a perimeter barrier embodiment that forms treatment areas 28 in the ground. Centers of arced portions of perimeter barriers 22 are positioned at apices of imaginary squares. The imaginary squares are depicted as dashed lines. First circular barrier 22' may be formed in the soil to define first treatment area 28'. Second barrier 22" may be formed around a portion of second treatment area 28". Second barrier 22" may have an arced portion with a radius that is substantially equal to the radius of first circular barrier 22'. The center of second barrier 22" may be located such that if the second barrier were formed as a complete circle, the second barrier would contact the first barrier at a tangent point. Second barrier 22" may include linear sections 114 that allow for a larger area to be enclosed for the same or a lesser length of perimeter barrier than would be needed to complete the second barrier as a circle. Two additional perimeter barriers may be formed to complete a unit of four treatment areas.

Figure 20:
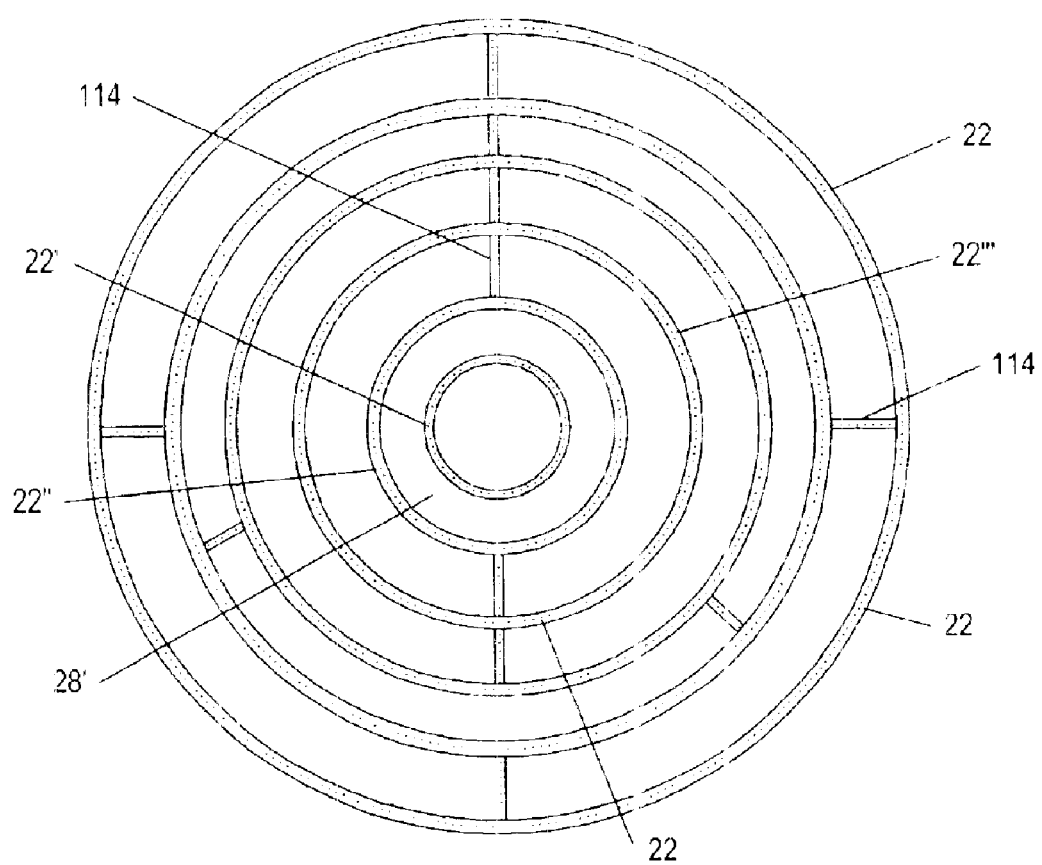
FIG. 20 depicts a plan view representation of an embodiment of treatment areas formed by perimeter barriers radially positioned around a central point.

FIG. 20 depicts an embodiment of a barrier configuration in which perimeter barriers 22 are formed radially about a central point. Soil remediation wells may be installed in the central area. A ring of soil between second barrier 22" and first barrier 22' may be treatment area 28'. Third barrier 22''' may be formed around second barrier 22". The pattern of barriers may be extended as needed. A ring of soil between an inner barrier and an outer barrier may be a treatment area. If the area of a ring is too large to be treated as a whole, linear sections 114 extending from the inner barrier to the outer barrier may be formed to divide the ring into a number of treatment areas. In some embodiments, distances between barrier rings may be substantially the same. In other embodiments, a distance between barrier rings may be varied to adjust the area enclosed by the barriers.

An advantage of using freeze wells with a soil remediation system is that the freeze wells may form a barrier that inhibits fluid flow into or out of a treatment area. Inhibiting excess fluid from entering the treatment area may significantly reduce heating costs associated with heating the soil in an ISTD soil remediation process, and may reduce size and cost of an off-gas treatment facility. Inhibiting fluid inflow may allow the soil to be heated to temperatures significantly above the boiling point of water. The heating time may be significantly reduced. Heater wells may be positioned close to freeze wells. Some of the heater wells may be placed in or close to a frozen barrier. Such heater wells may thaw a portion of the barrier, but not break through the barrier during soil remediation.

An advantage of using freeze wells with a soil remediation system is that the types of contaminated soil and the types of contamination that may be treated are expanded. The use of freeze wells may allow treatment of contaminated soil in both vadose and saturated soil zones with a single soil remediation process. Soil adjacent to large bodies of water may be remediated. Large bodies of water may be oceans, lakes, and/or rivers. Soil within a water recharge zone may be treated. The use of freeze wells to form a barrier around a treatment area may expand the types of soil that an ISTD soil remediation system can remediate. For example, an ISTD soil remediation system may be used to remediate contamination in fractured bedrock that is located below the water table.

An advantage of using freeze wells with an ISTD soil remediation system is that hard-to-remove contamination, such as dense non-aqueous phase liquids (DNAPL), may be remediated. DNAPL fluids may include, but are not limited to, chlorinated solvents, polychlorinated biphenyls, and mercury. A frozen barrier may provide an impermeable barrier that allows high vacuum to be applied to a treatment area so that vaporized contaminants may be removed from the soil.

An advantage of using freeze wells with a soil remediation system is that the freeze wells may isolate a treatment area. A barrier formed by the freeze wells may inhibit migration of contaminants from the treatment area to adjacent areas during a remediation process. For example, freeze wells surrounding a treatment area may inhibit DNAPL contaminants within fractured bedrock from flowing through fractures into adjacent areas during an ISTD soil remediation process. The frozen barrier formed by the freeze wells may be located at a desired depth. The depth of the frozen barrier may be significantly deeper than a barrier obtainable by driving metal sheet into the soil. A frozen barrier formed by freeze wells may not require forming an opening completely around a treatment area, as may be required with a grout wall barrier, since the freeze wells will freeze soil between freeze wells. Freeze wells may be used to form a bottom barrier for a treatment area using slanted or directionally drilled wells and/or using portions of soil remediation wellbores.

The use of freeze wells to form a barrier may have a small effect on the soil after remediation. The freeze wells may limit the extent of unwanted heating outside of a treatment area during a thermal remediation process. A frozen barrier may dissipate when the maintenance of the freeze wells is ended. Freeze wells may be removed from the soil after a frozen barrier has been allowed to dissipate. The freeze wells may be removed from the soil and freeze well wellbores may be filled with fill material. Further advantages of using freeze wells may include that the freeze wells are simple, efficient, reliable, and inexpensive; yet the freeze wells may also be easy to manufacture, install, and use.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of soil contamination remediation, comprising:
    placing a plurality of freeze wells in a pattern along a perimeter of soil to be treated;
    cooling soil adjacent to the freeze wells to form a frozen barrier, and
    remediating the soil to be treated to reduce contaminant levels within the soil to be treated, wherein remediating the soil to be treated comprises heating the soil to be treated to at least 100° C.

2. The method of claim 1, wherein remediation is initiated after forming the frozen barrier.

3. The method of claim 1, further comprising adding water to the soil adjacent to the freeze wells.

4. The method of claim 1, wherein placing the plurality of freeze wells comprises forming freeze wells in pre-drilled wellbores.

5. The method of claim 1, wherein placing the plurality of freeze wells comprises impacting casings for freeze wells into soil along the perimeter of the soil to be treated.

6. The method or claim 1, wherein placing the plurality of freeze wells comprises vibrationally inserting casings for the freeze wells into soil along the perimeter of the soil to be treated.

7. The method of claim 1, wherein placing the plurality of freeze well comprises using coiled tube installation to place freeze well casings soil along the perimeter of the soil to be treated.

8. The method of claim 1, wherein placing the plurality of freeze wells comprises placing refrigerant conduits in wellbores.

9. The method of claim 1, wherein placing the plurality of freeze wells comprises placing a first row of freeze wells into soil along the perimeter of the soil to be treated, and placing a second row of freeze wells offset and to a side of the first row of freeze wells.

10. The method of claim 9, wherein a spacing between one of the freeze wells in the first row and one of the freeze wells in the second row is about one-half a distance between adjacent freeze wells in the first row.

11. The method of claim 9, wherein freeze wells in the first row and freeze wells in the second row are offset to form an isosceles triangle pattern of freeze wells.

12. The method of claim 1, wherein placing the plurality of freeze wells comprises directionally drilling a portion of the freeze wells so that the freeze wells form a side frozen barrier and a bottom frozen barrier when activated.

13. The method of claim 1, wherein placing the plurality of freeze wells comprises directionally drilling a portion of the freeze wells so that the freeze wells form a side frozen barrier and a top frozen barrier.

14. The method of claim 1, wherein placing the plurality of freeze wells comprises slanting wellbores of some of the freeze wells to form a "V" shaped pattern of freeze wells.

15. The method of claim 1, wherein cooling the soil adjacent to the freeze wells comprises inhibiting fluid flow adjacent to the freeze wells, and transferring heat from the soil adjacent to the freeze wells and the soil to be treated to the freeze wells.

16. The method of claim 1, further comprising pumping water from the soil to be treated prior to remediating the soil to be treated.

17. The method of claim 1, further comprising measuring piezometric water head inward and outward of the freeze wells to determine when the frozen barrier is formed.

18. The method of claim 1, further comprising using a tracer test to test for completion of the frozen barrier before remediating the soil to be treated.

19. The method of claim 1, wherein cooling the soil adjacent to the freeze wells comprises placing a cryogenic fluid in the freeze wells and transferring heat from the soil adjacent to the freeze wells to the cryogenic fluid.

20. The method of claim 1, wherein cooling the soil adjacent to the freeze wells comprises circulating a refrigerant liquid through the freeze wells, and transferring heat from the soil adjacent to the freeze wells to the refrigerant liquid.

21. The method of claim 20, wherein the refrigerant liquid comprises calcium chloride brine.

22. The method of claim 20, wherein the refrigerant liquid comprises lithium chloride brine.

23. The method or claim 1, wherein cooling the soil adjacent to the freeze wells comprises circulating a refrigerant through the freeze wells in a vaporization-compression cycle so that heat transfers from the soil adjacent to the freeze wells to the refrigerant.

24. The method of claim 1, wherein remediating the soil comprises heating the soil and removing off-gas from the soil to be treated.

25. The method of claim 1, wherein remediating the soil comprises heating the soil to be treated with heaters placed in the soil to be treated and removing off-gas from the soil to be treated, and wherein the frozen barrier is configured to encompass at least one of the heaters prior to heater initiation.

26. The method of claim 1, wherein remediating the soil comprises applying electrical current to the soil to be treated to resistively heat the soil to be treated, and wherein the frozen barrier inhibits electrical current from passing out of the treatment area.

27. The method of claim 1, wherein remediating the soil comprises introducing a drive fluid into the soil to be treated to move contamination toward extraction wells.

28. The method of claim 1, wherein remediating the soil comprises introducing a chemical reactant into the soil to be treated to react with contamination.

29. The method of claim 1, wherein remediating the soil comprises introducing a biological reactant into the soil to be treated to react with contamination.

30. The method of claim 1, further comprising placing wellbores into the soil to be treated through the soil contamination into a soil layer below the soil contamination, placing a second plurality of freeze wells in the wellbores adjacent to the soil layer below the soil contamination, and cooling the soil layer below the soil contamination with the second plurality of freeze wells to form a bottom frozen barrier.

31. The method of claim 1, further comprising forming a ground cover over the soil to be treated, and sealing the ground cover to the frozen barrier.

32. A system for remediating soil, comprising:
freeze wells placed around a portion of a perimeter of a treatment area, the freeze wells configured to form a frozen barrier in soil adjacent to the treatment area that inhibits fluid flow into or out of the treatment area; and
a soil remediation system placed in the treatment area, wherein the soil remediation system is configured to reduce contamination within soil in the treatment area, and wherein the soil remediation system is configured to heat the soil in the treatment area to at least 100° C.

33. The system at claim 32, wherein the freeze wells comprise two rows of freeze wells, wherein a first row of freeze wells is offset from a second row of freeze wells such that the freeze wells are substantially in an isosceles triangle pattern.

34. The system at claim 32, wherein a portion of the freeze wells are directionally positioned in the soil adjacent to the treatment so that the freeze wells are configured to form a frozen side barrier and a frozen bottom barrier.

35. The system of claim 32, wherein some of the freeze wells comprise wellbores angled into the soil adjacent to the treatment area so that a portion of the frozen barrier formed by the freeze wells with angled wellbores has a "V" shape.

36. The system of claim 32, wherein a freeze well of the freeze wells comprises a casing, and wherein a cryogenic fluid is placed in the casing to cool soil adjacent to the freeze well.

37. The system of claim 32, wherein a freeze well of the freeze wells comprises an open wellbore, and wherein a cryogenic fluid is placed in the open wellbore to cool soil adjacent to the freeze well.

38. The system of claim 32, wherein a plurality of freeze wells are coupled together, and wherein a refrigeration system circulates refrigerant through the plurality of freeze wells.

39. The system of claim 38, wherein the refrigeration system comprises a vaporization-compression cycle refrigeration system.

40. The system of claim 38, wherein a freeze well of the plurality of freeze wells comprises a casing and an inlet tube, and wherein refrigerant flows into the casing through the inlet tube and through an annular space between the inlet tube and the casing.

41. The system of claim 38, wherein a freeze well of the plurality of freeze wells comprises a casing and a coiled tube.

42. The system of claim 38, wherein a freeze well of the plurality of freeze wells comprises a coiled tube placed within an open wellbore.

43. The system of claim 32, wherein the soil remediation system comprises an in situ thermal desorption soil remediation system.

44. The system of claim 32, wherein the soil remediation system comprises a soil vapor extraction soil remediation system.

45. The system of claim 32, wherein the soil remediation system comprises a fluid injection soil remediation system, wherein the injected fluid is a drive fluid configured to move contamination toward an extraction well.

46. The system of claim 32, wherein the soil remediation system comprises a fluid injection system, wherein the injected fluid is a reactant configured to reduce contamination within the soil in the treatment area.

47. The system of claim 32, wherein the soil remediation system comprises an in situ thermal desorption soil remediation system, and wherein the soil in the treatment area is heated by soil resistivity heating.

48. A method of forming a frozen barrier for a soil remediation system, comprising:
forming a plurality of wellbores for freeze wells in soil along a portion of a perimeter of a treatment area;
placing a first cryogenic fluid in the wellbores to form a frozen barrier adjacent to the wellbores that inhibits fluid flow into the wellbores from soil adjacent to the wellbores;
expanding the frozen barrier outward; and
installing a soil remediation system in the treatment area, wherein the soil remediation system is configured to heat soil in the treatment area to at least 100° C.

49. The method of claim 48, wherein the first cryogenic fluid comprises liquid nitrogen.

50. The method claim 48, further comprising placing water in selected wellbores to saturate the soil adjacent to the wellbores, and removing excess water from the wellbores.

51. The method of claim 48, wherein expanding the frozen barrier outward comprises replacing the first cryogenic fluid with a second cryogenic fluid, wherein the second cryogenic fluid comprises a higher temperature, less expensive fluid than the first cryogenic fluid.

52. The method of claim 51, wherein the first cryogenic fluid comprises liquid nitrogen, and wherein the second cryogenic fluid comprises a bath of dry ice and a low freezing point liquid.

53. A system for soil remediation comprising:
freeze wells placed in soil around a portion of a perimeter of a treatment area, the freeze wells configured to form a side frozen barrier;
soil remediation wells placed in the treatment area, wherein the soil remediation wells are configured to heat soil in the treatment area to at least 100° C., and wherein a first portion of one or more of the soil remediation wells extends below soil contamination into a permeable soil layer; and
refrigeration conduits within the first portion of at least one of the soil remediation wells, wherein the refrigerant conduits allow formation of a bottom frozen barrier in the permeable soil layer below the contaminated soil.

54. The system of claim 53, wherein the freeze wells comprise two rows or freeze wells, wherein a first row of freeze wells is offset from a second row of freeze wells such that the freeze wells are substantially in an isosceles triangle pattern.

55. The system of claim 53, further comprising a ground cover over the treatment area and scaled to the side frozen barrier.

56. A method of remediating soil comprising:
forming a frozen barrier along a portion of a perimeter of a treatment area to inhibit fluid flow into the treatment area;
heating contaminated soil within the treatment area to at least 100° C.; and
removing contamination from the contaminated soil within the treatment area.

57. The method of claim 56, wherein forming the frozen barrier comprises adding water to soil adjacent to freeze wells, and cooling the soil adjacent to the freeze wells to solidify the water.

58. The method of claim 56, wherein forming the frozen barrier comprises cooling soil adjacent to the freeze wells to solidify water within the soil adjacent to the freeze wells.

59. The method of claim 56, wherein forming the frozen barrier comprises cooling soil along the portion of the perimeter of the treatment area using two rows of freeze wells arranged in a staggered pattern.

60. The method of claim 56, further comprising determining completion of formation of the frozen barrier using piezometers placed inside of the treatment area and outside of the treatment area.

61. The method of claim 56, further comprising testing for complete formation of the frozen barrier using a tracer test.

62. The method of claim 56, further comprising placing a ground cover over the treatment area and sealing the ground cover to the frozen barrier.

63. The method of claim 56, wherein healing the soil within the treatment area comprises applying heat to the soil within the treatment area from heater wells in the soil within the treatment area.

64. The method of claim 63, wherein the frozen barrier encompasses at least one heater well of the heater wells before the heater well is initiated to heat the soil within the treatment area.

65. The method of claim 56, wherein removing the contamination from the contaminated soil within the treatment area removing off-gas from the soil within the treatment area through extraction wells.

66. The method of claim 65, further comprising converting a portion of the extraction wells to injection wells and introducing a fluid into the treatment area through the injection wells.

67. The method of claim 66, further comprising converting the injection wells back to extraction wells.

68. The method of claim 56, further comprising inserting a fluid into the soil within the treatment area through injection wells to promote removal of the contamination from the soil within the treatment area.

69. The method of claim 56, wherein heating the soil within the treatment area comprises applying a current to the soil within the treatment area to resistively heat the soil within the treatment area.

70. The method of claim 56, further comprising inserting a plurality of soil remediation wells into the treatment area, wherein a portion of the soil remediation wells are configured to heat the soil within the treatment area, and cooling soil below the contaminated soil to form a bottom barrier using bottom portions of selected soil remediation wells.

71. The method of claim 56, wherein freeze wells form the frozen barrier, and wherein selected freeze wells are directionally drilled so that the selected freeze wells form a perimeter frozen barrier and a bottom frozen barrier.

72. A method of remediating soil comprising:
installing freeze wells along a portion of a perimeter of a treatment area;
installing water wells to a first side of the freeze wells;
using the water wells to inhibit water flow adjacent to the freeze wells;
forming a frozen barrier using the freeze wells; and
installing a soil remediation system in the treatment area, wherein the soil remediation system is configured to heat soil in the treatment area to at least 100° C.

73. The method of claim 72, further comprising remediating the soil in the treatment area using the soil remediation system.

74. The method of claim 72, wherein the soil remediation system comprises an in situ thermal desorption soil remediation system.

75. The method of claim 72, further comprising converting the water wells to test wells after formation of the frozen barrier.

76. The method of claim 72, further comprising installing water wells on a second side of the freeze wells.

77. The method of claim 72, wherein the freeze walls comprise two rows of freeze wells placed in a staggered pattern.

78. The method of claim 72, further comprising installing water wells on a second side of the freeze wells, and operating the water wells on the first side of the freeze wells and the water wells on the second side of the freeze wells to inhibit water flow through soil adjacent to the freeze wells.

79. The method of claim 72, further comprising using suction wells to remove water from the treatment area after formation of the frozen barrier.

80. A method of soil contamination remediation, comprising:
placing a plurality of freeze wells in a pattern along a perimeter of soil to be treated;
cooling soil adjacent to the freeze wells to form a frozen barrier; and
remediating the soil to be treated to reduce contaminant levels within the soil to be treated, wherein remediating the soil to be treated comprises heating the soil to be treated to at least a vaporization temperature of at least one contaminant in the soil to be treated.

81. The method of claim 80, wherein remediation is initiated after forming the frozen barrier.

82. The method of claim 80, further comprising adding water to the soil adjacent to the freeze wells.

83. The method of claim 80, wherein placing the plurality of freeze wells comprises forming freeze wells in pre-drilled wellbores.

84. The method of claim 80, wherein placing the plurality of freeze wells comprises impacting casings for the freeze wells into soil along the perimeter of the soil to be treated.

85. The method of claim 80, wherein placing the plurality of freeze wells comprises vibrationally inserting casings for the freeze wells into soil along the perimeter of the soil to be treated.

86. The method of claim 80, wherein placing the plurality of freeze wells comprises using coiled tube installation to place freeze well casings in soil along the perimeter of the soil to be treated.

87. The method of claim 80, wherein placing the plurality of freeze wells comprises placing refrigerant conduits in wellbores.

88. The method of claim 80, wherein placing the plurality of freeze wells comprises placing a first row of freeze wells into soil along the perimeter of the soil to be treated, and placing a second row of freeze wells offset and to a side of the first row of freeze wells.

89. The method of claim 88, wherein a spacing between one of the freeze wells in the first row and one of the freeze wells in the second row is about one-half a distance between adjacent freeze wells in the first row.

90. The method of claim 88, wherein freeze wells in the first row and freeze wells in the second row are offset to form an isosceles triangle pattern of freeze wells.

91. The method of claim 80, wherein placing the plurality of freeze wells comprises directionally drilling a portion of the freeze wells so that the freeze wells form a side frozen barrier and a bottom frozen barrier when activated.

92. The method of claim 80, wherein placing the plurality of freeze wells comprises directionally drilling a portion of the freeze wells so that the freeze wells form a side frozen barrier and a top frozen barrier.

93. The method of claim 80, wherein placing the plurality of freeze wells comprises slanting wellbores of some of the freeze wells to form a "V" shaped pattern of freeze wells.

94. The method of claim 80, wherein cooling the soil adjacent to the freeze wells comprises inhibiting fluid flow adjacent to the freeze wells, and transferring heat from the soil adjacent to the freeze wells and the soil to be treated to the freeze wells.

95. The method of claim 80, further comprising pumping water from the soil to be treated prior to remediating the soil to be treated.

96. The method of claim 80, further comprising measuring piezometric water head inward and outward of the freeze wells to determine when the frozen barrier is formed.

97. The method of claim 80, further comprising using a tracer test to test for completion of the frozen barrier before remediating the soil to be treated.

98. The method of claim 80, wherein cooling the soil adjacent to the freeze wells comprises placing a cryogenic fluid in the freeze wells and transferring heat from the soil adjacent to the freeze wells to the cryogenic fluid.

99. The method of claim 80, wherein cooling the soil adjacent to the freeze wells comprises circulating a refrigerant liquid through the freeze wells, and transferring heat from the soil adjacent to the freeze wells to the refrigerant liquid.

100. The method of claim 99, wherein the refrigerant liquid comprises calcium chloride brine.

101. The method of claim 99, wherein the refrigerant liquid comprises lithium chloride brine.

102. The method of claim 80, wherein cooling the soil adjacent to the freeze wells comprises circulating a refrigerant through the freeze wells in a vaporization-compression cycle so that heat transfers from the soil adjacent to the freeze wells to the refrigerant.

103. The method of claim 80, wherein remediating the soil comprises heating the soil and removing off-gas from the soil to be treated.

104. The method of claim 80, wherein remediating the soil comprises heating the soil to be treated with heaters placed in the soil to be treated and removing off-gas from the soil to be treated, and wherein the frozen barrier is configured to encompass at least one of the heaters prior to heater initiation.

105. The method of claim 80, wherein remediating the soil comprises applying electrical current to the soil to be treated to resistively heat the soil to be treated, and wherein the frozen barrier inhibits electrical current from passing out of the treatment area.

106. The method of claim 80, wherein remediating the soil comprises introducing a drive fluid into the soil to be treated to move contamination toward extraction wells.

107. The method of claim 80, wherein remediating the soil comprises introducing a chemical reactant into the soil to be treated to react with contamination.

108. The method of claim 80, wherein remediating the soil comprises introducing a biological reactant into the soil to be treated to react with the contamination.

109. The method of claim 80, further comprising placing wellbores into the soil to be treated through the soil contamination into a soil layer below the soil contamination, placing a second plurality of freeze wells in the wellbores adjacent to the soil layer below the soil contamination, and cooling the soil layer with the second plurality of freeze wells to form a bottom frozen barrier.

110. The method of claim 80, further comprising forming a ground cover over the contaminated soil, and sealing the ground cover to the frozen barrier.

111. A system for remediating soil, comprising:
freeze wells placed around a portion of a perimeter of a treatment area, the freeze wells configured to form a frozen barrier in the soil adjacent to the treatment area that inhibits fluid flow into or out of the treatment area; and
a soil remediation system placed in the treatment area, wherein the soil remediation system is configured to reduce contamination within soil in the treatment area, and wherein the soil remediation system is configured to heal the soil in the treatment area to at least a vaporization temperature of at least one contaminant in the soil in the treatment area.

112. The system of claim 111, wherein the freeze wells comprise two rows of freeze wells, wherein a first row of freeze wells is offset from a second row of freeze wells such that the freeze wells are substantially in an isosceles triangle pattern.

113. The system of claim 111, wherein a portion of the freeze wells are directionally positioned in the soil adjacent to the treatment area so that the freeze wells are configured to form a frozen side barrier and a frozen bottom barrier.

114. The system of claim 111, wherein some of the freeze wells comprise wellbores angled into the soil adjacent to the treatment area so that a portion of the frozen barrier formed by the freeze wells with angled wellbores has a "V" shape.

115. The system of claim 111, wherein a freeze well of the freeze wells comprises a casing, and wherein a cryogenic fluid is placed in the casing to cool soil adjacent to the freeze well.

116. The system of claim 111, wherein a freeze well of the freeze wells comprises an open wellbore, and wherein a cryogenic fluid is placed in the open wellbore to cool soil adjacent to the freeze well.

117. The system of claim 111, wherein a plurality of freeze wells are coupled together, and wherein a refrigeration system circulates refrigerant through the plurality of freeze wells.

118. The system of claim 117, wherein the refrigeration system comprises a vaporization-compression cycle refrigeration system.

119. The system of claim 117, wherein a freeze well of the plurality of freeze wells comprises a casing and an inlet tube, and wherein refrigerant flows into the casing through the inlet tube and through an annular space between the inlet tube and the casing.

120. The system of claim 117, wherein a freeze well of the plurality of freeze wells comprises a casing and a coiled tube.

121. The system of claim 117, wherein a freeze well of the plurality of freeze wells comprises a coiled tube placed within an open wellbore.

122. The system of claim 111, wherein the soil remediation system comprises an in situ thermal desorption soil remediation system.

123. The system of claim 111, wherein the soil remediation system comprises a soil vapor extraction soil remediation system.

124. The system of claim 111, wherein the soil remediation system comprises a fluid injection soil remediation system, wherein the injected fluid is a drive fluid configured to move contamination toward an extraction well.

125. The system of claim 111, wherein the soil remediation system comprises a fluid injection system, wherein the injected fluid is a reactant configured to reduce contamination within the soil in the treatment area.

126. The system of claim 111, wherein the soil remediation system comprises an in situ thermal desorption soil remediation system, and wherein the soil in the treatment area is heated by soil resistivity heating.

127. A method of forming a frozen barrier for a soil remediation system, comprising:
   forming a plurality of wellbores for freeze wells in soil along a portion of a perimeter of a treatment area;
   placing a first cryogenic fluid in the wellbores to form a frozen barrier adjacent to the wellbores that inhibits fluid flow into the wellbores from soil adjacent to the wellbores;
   expanding the frozen barrier outward; and
   installing a soil remediation system in the treatment area, wherein the soil remediation system is configured to heat soil in the treatment area to at least a vaporization temperature of at least one contaminant in the soil in the treatment area.

128. The method of claim 127, wherein the first cryogenic fluid comprises liquid nitrogen.

129. The method of claim 127, further comprising placing water in selected wellbores to saturate the soil adjacent to the wellbores, and removing excess water from the wellbores.

130. The method of claim 127, wherein expanding the frozen barrier outward comprises replacing the first cryogenic fluid with a second cryogenic fluid, wherein the second cryogenic fluid comprises a higher temperature, less expensive fluid than the first cryogenic fluid.

131. The method of claim 130, wherein the first cryogenic fluid comprises liquid nitrogen, and wherein the second cryogenic fluid comprises a bath of dry ice and a low freezing point liquid.

132. A system for soil remediation comprising:
   freeze wells placed in soil around a portion of a perimeter of a treatment area, the freeze wells configured to form a side frozen barrier;
   soil remediation wells placed in the treatment area, wherein the soil remediation wells are configured to heat the soil in the treatment area to at least a vaporization temperature of at least one contaminant in the soil in the treatment area, and wherein a first portion of one or more of the soil remediation wells extends below soil contamination into a permeable soil layer; and
   refrigeration conduits within the first portion of at least one of the soil remediation wells, wherein the refrigerant conduits allow formation of a bottom frozen barrier in the permeable soil layer below the contaminated soil.

133. The system of claim 132, wherein the freeze wells comprise two rows of freeze wells, wherein a first row of freeze wells is offset from a second row of freeze wells such that the freeze wells are substantially in an isosceles triangle pattern.

134. The system of claim 132, further comprising a ground cover over the treatment area and sealed to the side frozen barrier.

135. A method of remediating soil comprising:
   forming a frozen barrier along a portion of a perimeter of a treatment area to inhibit fluid flow into the treatment area;
   heating soil within the treatment area to at least a vaporization temperature of at least one contaminant in the treatment area; and
   removing contamination from the contaminated soil within the treatment area.

136. The method of claim 135, wherein forming the frozen barrier comprises adding water to soil adjacent to freeze wells, and cooling the soil adjacent to the freeze wells to solidify the water.

137. The method of claim 135, wherein forming the frozen barrier comprises cooling soil adjacent to the freeze wells to solidify water within the soil adjacent to the freeze wells.

138. The method of claim 135, wherein forming the frozen barrier comprises cooling soil along the portion of the perimeter of the treatment area using two rows or freeze wells arranged in a staggered pattern.

139. The method of claim 135, further comprising determining completion of formation of the frozen barrier using piezometers placed inside of the treatment area and outside of the treatment area.

140. The method of claim 135, further comprising testing for complete formation of the frozen barrier using a tracer test.

141. The method of claim 135, further comprising placing a ground cover over the treatment area and sealing the ground cover to the frozen barrier.

142. The method of claim 135, wherein heating the soil within the treatment area comprises applying heat to the soil within the treatment area from heater wells in the soil within the treatment area.

143. The method of claim 142, wherein the frozen barrier encompasses at least one heater well of the heater wells before the heater well is initiated to heat the soil within the treatment area.

144. The method of claim 135, wherein removing the contamination from the contaminated soil within the treatment area comprises removing off-gas from the soil within the treatment area through extraction wells.

145. The method of claim 135, further comprising converting a portion of the extraction wells to injection wells, and introducing a fluid into the treatment area through the injection wells.

146. The method of claim 145, further comprising converting the injection wells back to extraction wells.

147. The method of claim 135, further comprising inserting a fluid into the soil within the treatment area through injection wells to promote removal of the contamination from the soil within the treatment area.

148. The method of claim 135, wherein heating the soil within the treatment area comprises applying a current to the soil within the treatment area to resistively heat the soil within the treatment area.

149. The method of claim 135, further comprising inserting a plurality of soil remediation wells into the treatment area, wherein a portion of the soil remediation wells are configured to heat the soil within the treatment area, and cooling soil below the contaminated soil to form a bottom barrier using bottom portions of selected soil remediation wells.

150. The method of claim 135, wherein freeze wells form the frozen barrier, and wherein selected freeze wells are directionally drilled so that the selected freeze wells form a perimeter frozen barrier and a bottom frozen barrier.

151. A method of remediating soil comprising:
    installing freeze wells along a portion of a perimeter of a treatment area;
    installing water wells to a first side of the freeze wells;
    using the water wells to inhibit water flow adjacent to the freeze wells;
    forming a frozen barrier using the freeze wells; and
    installing a soil remediation system in the treatment area, wherein the soil remediation system is configured to heat soil in the treatment area to at least a vaporization temperature of at least one contaminant in the treatment area.

152. The method of claim 151, further comprising remediating soil in the treatment area using the soil remediation system.

153. The method of claim 151, wherein the soil remediation system comprises an in situ thermal desorption soil remediation system.

154. The method of claim 151, further comprising converting the water wells to test wells after formation of the frozen barrier.

155. The method of claim 151, further comprising installing water wells on a second side of the freeze wells.

156. The method of claim 151, wherein the freeze wells comprise two rows of freeze wells placed in a staggered pattern.

157. The method of claim 151, further comprising installing water wells on a second side of the freeze wells, and operating the water wells on the first side of the freeze wells and the water wells on the second side of the freeze wells to inhibit water flow through soil adjacent to the freeze wells.

158. The method of claim 151, further comprising using suction wells to remove water from the treatment area after formation of the frozen barrier.

* * * * *

UNITED STATES PATENT AND TRADEMARK OFFICE
CERTIFICATE OF CORRECTION

PATENT NO. : 6,854,929 B2
DATED : February 15, 2005
INVENTOR(S) : Vinegar et al.

It is certified that error appears in the above-identified patent and that said Letters Patent is hereby corrected as shown below:

Column 34,
Line 15, please delete "casings soil" and substitute therefor -- casings in soil --.
Line 17, please delete "or freeze" and substitute therefor -- of freeze --.
Line 22, please delete "scaled" and substitute therefor -- sealed --.

Column 40,
Line 48, please delete "to heal" and substitute therefor -- to heat --.

Signed and Sealed this

Fourteenth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,854,929 B2
DATED : February 15, 2005
INVENTOR(S) : Vinegar et al.

It is certified that error appears in the above-identified patent and that said Letters Patent is hereby corrected as shown below:

<u>Column 34,</u>
Line 15, delete "casings soil" and substitute -- casings in soil --.

<u>Column 37,</u>
Line 17, delete "or freeze" and substitute -- of freeze --.
Line 22, delete "scaled" and substitute -- sealed --.

<u>Column 40,</u>
Line 48, delete "to heal" and substitute -- to heat --.

This certificate supersedes Certificate of Correction issued June 14, 2005.

Signed and Sealed this

Fourth Day of April, 2006

JON W. DUDAS
*Director of the United States Patent and Trademark Office*